United States Patent
Lee et al.

(10) Patent No.: US 11,271,441 B2
(45) Date of Patent: Mar. 8, 2022

(54) WIRELESS POWER TRANSFER APPARATUS, WIRELESS POWER RECEPTION APPARATUS, AND SYSTEM INCLUDING THE SAME

(71) Applicant: LG Electronics Inc., Seoul (KR)

(72) Inventors: Jaewoo Lee, Seoul (KR); Hyunwook Moon, Seoul (KR); Euisung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/178,629

(22) Filed: Feb. 18, 2021

(65) Prior Publication Data

US 2021/0257866 A1 Aug. 19, 2021

(30) Foreign Application Priority Data

Feb. 18, 2020 (KR) .................. 10-2020-0019886

(51) Int. Cl.
*H02J 50/80* (2016.01)
*H02J 7/00* (2006.01)
*H02J 50/12* (2016.01)
*A47J 43/046* (2006.01)

(52) U.S. Cl.
CPC .......... *H02J 50/80* (2016.02); *H02J 7/00308* (2020.01); *H02J 50/12* (2016.02); *A47J 43/046* (2013.01); *H02J 2310/14* (2020.01)

(58) Field of Classification Search
CPC ........ H02J 50/80; H02J 50/12; H02J 7/00308; H02J 2310/14; H02J 7/00; A47J 43/046
See application file for complete search history.

(56) References Cited

U.S. PATENT DOCUMENTS

2017/0279310 A1 9/2017 Il et al.
2018/0287396 A1* 10/2018 Hanabusa ............... H02J 50/10

FOREIGN PATENT DOCUMENTS

EP 3582466 2/2020
EP 3605780 2/2020

OTHER PUBLICATIONS

Extended European Search Report in European Appln. No. 21157849.7, dated Jun. 17, 2021, 10 pages.

* cited by examiner

*Primary Examiner* — Robert L Deberadinis
(74) *Attorney, Agent, or Firm* — Fish & Richardson P.C.

(57) ABSTRACT

A system includes a wireless power transfer apparatus and a wireless power reception apparatus. The wireless power transfer apparatus includes a transmitting coil, an inverter including switching elements, and a first controller configured to calculate an output level of power transmitted through the transmitting coil, receive data on a target level for power transmitted through the transmitting coil from the wireless power reception apparatus, and control the inverter based on comparing the output level and the target level. The wireless power reception apparatus includes a receiving coil, a rectifier configured to rectify power transmitted from the receiving coil, a capacitor connected to the rectifier, and a second controller configured to calculate a voltage applied to the capacitor, determine the target level based on comparing the calculated voltage and a first reference voltage, and transmit the target level to the wireless power transfer apparatus.

20 Claims, 13 Drawing Sheets

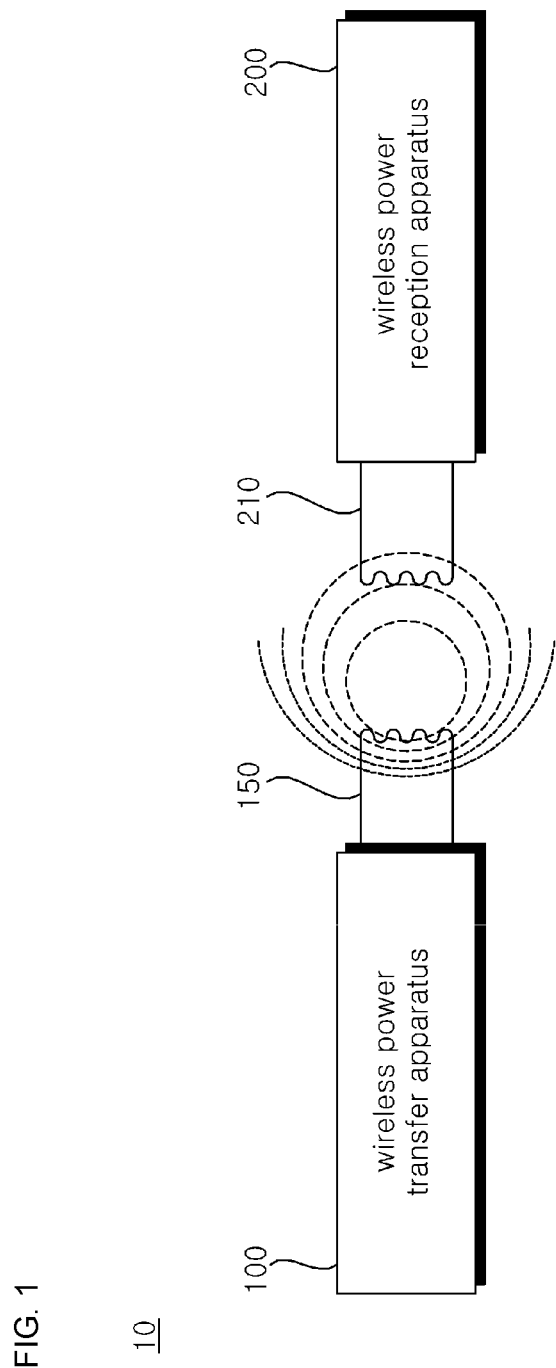

WIRELESS POWER TRANSFER APPARATUS, WIRELESS POWER RECEPTION APPARATUS, AND SYSTEM INCLUDING THE SAME

CROSS-REFERENCE TO RELATED APPLICATIONS

This application claims the benefit of priority to Korean Patent Application No. 10-2020-0019886, filed on Feb. 18, 2020. The disclosure of the prior application is incorporated by reference in its entirety.

BACKGROUND

Field of the Disclosure

The present disclosure relates to a wireless power transfer apparatus, a wireless power reception apparatus and a system including the same, and more particularly to a wireless power transfer apparatus, a wireless power reception apparatus and a system including the same, which may adjust a level of power transmitted and received wirelessly according to a state of a load of the wireless power reception apparatus.

Description of the Related Art

In general, when power is supplied to an electronic device, a supply method of supplying commercial power by connecting a physical cable or wire to the electronic device is used. In this supply method, the cable or wire occupies a considerable space, it is difficult to arrange the cable or wire, and there is a risk that the cable or wire is disconnected. In recent years, research on a wireless power supply method has been discussed to solve this problem.

The wireless power supply system may include a wireless power transfer apparatus that supplies power through a single coil or multiple coils, and a wireless power reception apparatus that receives and uses power wirelessly supplied from the wireless power transfer apparatus.

As the wireless power supply method, an inductive coupling method is mainly used. This method uses the principle that a magnetic field is changed by an alternating current flowing through a primary coil among two adjacent coils when the alternating current with varying current intensity flows through the primary coil, whereby magnetic flux passing through a secondary coil is changed, and an induced electromotive force is generated on the secondary coil. That is, according to this method, when only the current flowing through the primary coil is changed while the two coils are separated, the induced electromotive force is generated on the secondary coil.

Various small cooking appliances, such as a blender and a mini oven, which are commonly used in the kitchen, also require power supply, like other electronic appliances. In addition, for reasons of space utilization and safety, the demand for small cooking appliances to which the wireless power supply method is applied is also increasing rapidly.

Meanwhile, a conventional wireless power supply method is generally used for battery charging of the wireless power reception apparatus and in the conventional wireless power supply method, a level of power output from the wireless power transfer apparatus is controlled based on variations in input power supplied to the wireless power transfer apparatus. For example, as disclosed in related art 1 (US Patent Publication No. 2019/0027969), the wireless power transfer apparatus monitors the magnitude of the current input to the wireless power transfer apparatus, and limits the level of output power when the fluctuation of the current magnitude is more than a certain level.

However, in the case of the small cooking appliance, the specifications, a rated current, and a rated voltage of elements included in each appliance differ depending on the type or manufacturer of the appliance, so when the wireless power transfer apparatus controls the level of output power as in the prior art, it is practically difficult for the wireless power transfer apparatus to secure all information on each of the small cooking appliances and control the optimum level of output power to be delivered to each of the appliances.

In addition, in the case of battery charging, it is extremely rare that a state of the load of the wireless power reception apparatus changes continuously or rapidly. Accordingly, it is sufficient for the wireless power transfer apparatus to adjust the level of the output power so that a certain amount of power is transmitted while the battery of the wireless power reception apparatus is being charged, based on variations in power supplied to the wireless power transfer apparatus.

On the other hand, in the case of the small cooking appliances, the state of the load may change more frequently depending on the operating state compared to charging the battery, and in some cases, the state of the load may change rapidly. For example, in the case of a blender that grinds food by rotating the blade, the rotation speed of the motor that rotates the blade is determined according to the operation mode set by the user, and since the state of the load changes whenever the rotation speed of the motor changes, the voltage applied to the internal circuit elements of the blender may be changed. In addition, if food is rapidly crushed while the blender is pulverizing food, or the connection between the blade and the motor is disconnected and the motor is idle, the state of the load of the blender, which is the wireless power reception apparatus, may change rapidly.

As described above, in the case of the wireless power reception apparatus such as the small cooking appliances, while power is supplied from the wireless power transfer apparatus, a DC-link voltage of the wireless power reception apparatus may become unstable according to the change in the state of the load, and overvoltage may be applied when the state of the load rapidly changes from a full-load state to a light-load or no-load state.

However, as in the prior art, if the wireless power transfer apparatus simply adjusts the level of the output power, it is very difficult to control the DC-link voltage to be kept constant regardless of the type of the wireless power reception apparatus when the state of the load of the wireless power wireless power reception apparatus changes. In addition, there is a problem in that it is difficult to prevent the overvoltage from being applied to elements included in the wireless power reception apparatus.

SUMMARY

It is an object of the present disclosure to solve the above and other problems.

It is another object of the present disclosure to provide a wireless power transfer apparatus, a wireless power reception apparatus and a system including the same that may constantly maintain a DC-link voltage of a wireless power reception apparatus regardless of the type of the wireless power reception apparatus.

It is another object of the present disclosure to provide a wireless power transfer apparatus, a wireless power reception apparatus and a system including the same that may prevent an overvoltage from being applied to elements included in the wireless power reception apparatus A wireless power reception apparatus in a system in accordance with an exemplary embodiment of the present disclosure for accomplishing the above and other objects may be configured to: check a DC-link voltage applied to a DC capacitor, determine a target level for the power transmitted from a wireless power transfer apparatus by comparing the DC-link voltage and a reference voltage, and transmit data on the determined target level to the wireless power transfer apparatus, and the wireless power transfer apparatus in the system may be configured to control an operation of a switching element included in an inverter by comparing the data on the determined target level received from the wireless power reception apparatus with an output level of the currently transmitted power.

In addition, the wireless power transfer apparatus may comprise a transmitting coil configured to transmit power to the wireless power reception apparatus, an inverter including a plurality of switching elements and outputting a current to the transmission coil through the operation of the plurality of switching elements, and a first controller configured to calculate an output level of power transmitted through the transmitting coil, receive data on a target level for power transmitted through the transmitting coil from the wireless power reception apparatus, and control the inverter based on a result of comparing the calculated output level and the target level.

In addition, the wireless power reception apparatus may comprise a receiving coil configured to receive power from the wireless power transfer apparatus, a rectifier configured to rectify power transmitted from the receiving coil, a capacitor connected to an output terminal of the rectifier and a second controller configured to calculate a voltage applied to both ends of the capacitor, determine the target level based on a result of comparing the calculated voltage and a predetermined first reference voltage, and transmit data on the determined target level to the wireless power transfer apparatus.

In addition, the first controller of the wireless power transfer apparatus may configured to control the inverter to increase a frequency of the current output from the inverter when the output level is higher than a power range set according to the target level, control the inverter to decrease the frequency of the current output from the inverter when the output level is lower than the power range, and control the inverter to maintain the frequency of the current output from the inverter when the output level is included in the power range.

In addition, the second controller of the wireless power reception apparatus may configured to determine a level lower than a previous target level as the target level when the calculated voltage is higher than a voltage range set according to the predetermined first reference voltage, determine a level higher than the previous target level as the target level when the calculated voltage is lower than the voltage range, and maintain the previous target level as the target level when the calculated voltage is included in the voltage range.

In addition, the first controller of the wireless power transfer apparatus may configured to control the inverter to maintain the output level according to a predetermined power level lower than the target level when the target level is higher than or equal to a first reference level, and the output level is lower than a second reference level lower than the first reference level.

In addition, the first reference level may be a maximum level at which an overvoltage is not applied to the wireless power reception apparatus, regardless of an operating state of the wireless power reception apparatus.

In addition, the second reference level may be a minimum level at which operation power is applied to each component included in the wireless power reception apparatus.

In addition, the first controller may be configured to control the inverter to maintain the output level according to the predetermined power level when the output level is lower than the power range and a difference between the target level and the output level is greater than or equal to a predetermined difference.

In addition, the second controller may be configured to transmit data on the overvoltage to the wireless power transfer apparatus when the calculated voltage is higher than the voltage range and the calculated voltage is higher than or equal to a predetermined second reference voltage, and the first controller may be configured to control the inverter to maintain the output level according to the predetermined power level when data on the overvoltage is received from the wireless power reception apparatus, The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a block diagram illustrating a wireless power system according to an embodiment of the present disclosure.

DETAILED DESCRIPTION

Figure 2A:
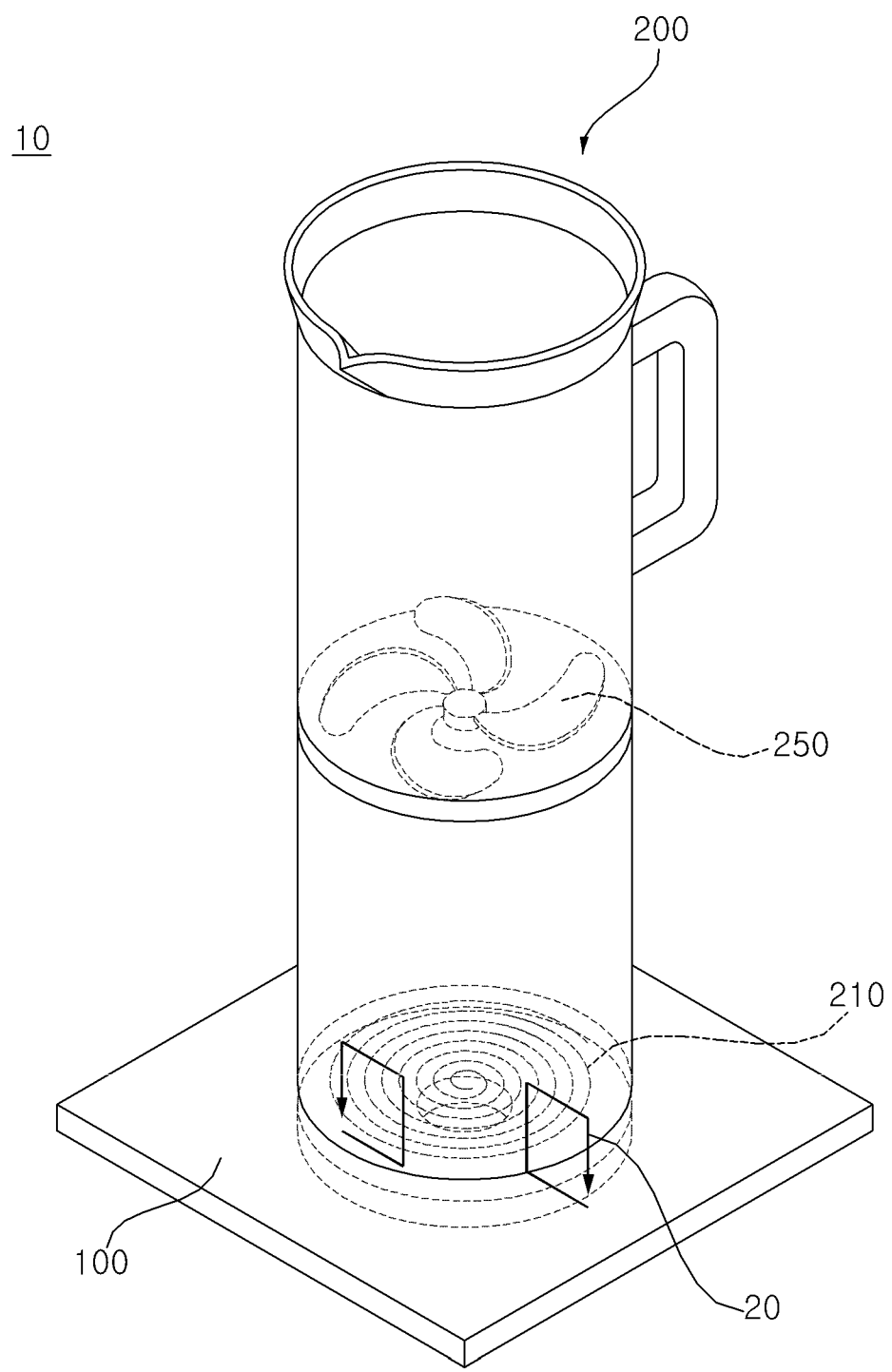
FIGS. 2A and 2B are diagrams referred to for explanation of an embodiment of components included in the wireless power system.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Unless otherwise defined, all terms including technical and scientific terms used herein have the same meaning as commonly understood by one of ordinary skill in the art to which the present disclosure belongs. Further, terms defined in a common dictionary will not be interpreted in an idealized or overly formal sense unless expressly so defined herein.

In the drawings, the thicknesses or the sizes of elements and graphs may be exaggerated, omitted or simplified to more clearly and conveniently illustrate the present disclosure.

FIG. 1 is a block diagram illustrating a wireless power system according to an embodiment of the present disclosure.

Referring to FIG. 1, a wireless power system 10 may include a wireless power transfer apparatus 100 for wirelessly transmitting power and a wireless power reception apparatus 200 for receiving the transmitted power.

The wireless power transfer apparatus 100 may wirelessly transmit power to the wireless power reception apparatus 200 by using a magnetic induction phenomenon by using a magnetic induction phenomenon in which a current is induced in a coil 210 included in the wireless power reception apparatus 200 according to a change in a magnetic field due to a current flowing through a coil 150 included in the wireless power transfer apparatus 100.

In this situation, the wireless power transfer apparatus 100 and the wireless power reception apparatus 200 may use a wireless power supply method of an electromagnetic induction method defined by a Wireless Power Consortium (WPC) or a Power Matters Alliance (PMA). Alternatively, the wireless power transfer apparatus 100 and the wireless power reception apparatus 200 may use a wireless power supply method of a magnetic resonance method defined in Alliance for Wireless Power (A4WP).

Hereinafter, in order to distinguish between the coil 150 included in the wireless power transfer apparatus 100 and the coil 210 included in the wireless power reception apparatus 200, the coil 150 included in the wireless power transfer apparatus 100 may be referred to as a transmitting coil, and the coil 210 included in the wireless power reception apparatus 200 may be referred to as a receiving coil.

According to an embodiment, one wireless power transfer apparatus 100 may transmit power to a plurality of the wireless power reception apparatus 200. At this time, the wireless power transfer apparatus 100 may transmit power to the plurality of wireless power reception apparatus 200 according to a time division method, but the present disclosure is not limited thereto. For example, the wireless power transfer apparatus 100 may transmit power to the plurality of wireless power reception apparatus 200 using different frequency bands allocated to each of the plurality of wireless power reception apparatus 200.

Meanwhile, the number of wireless power reception apparatus 200 capable of receiving power from one wireless power transfer apparatus 100 may be adaptively determined in consideration of the required amount of power of each of the plurality of wireless power reception apparatus 200 and the amount of available power of the wireless power transfer apparatus 100.

The wireless power reception apparatus 200 may receive power transmitted from the wireless power transfer apparatus 100. For example, the wireless power reception apparatus 200 may be a small cooking appliance such as a citrus press, a hand blender, a blender, a juicer, a kneader, a smart pan, a kettle, a rice cooker, etc.

The wireless power transfer apparatus 100 and the wireless power reception apparatus 200 may communicate with each other. According to an embodiment, the wireless power transfer apparatus 100 and the wireless power reception apparatus 200 may perform one-way communication or half-duplex communication.

In this situation, the communication method is an in-band communication method using the same frequency band as the operating frequency used for wireless power transmission and/or an out-of-band communication method using a frequency band different from the operating frequency used for wireless power transmission.

Meanwhile, data transmitted and received between the wireless power transfer apparatus 100 and the wireless power reception apparatus 200 may include data related to the state of the device, data related to power usage, data on battery charging, data on a voltage and/or a current, data on control commands and the like.

Meanwhile, when a cooking utensil such as a metal pot is positioned adjacent to the wireless power transfer apparatus 100, a magnetic field generated by a current flowing through the transmitting coil 150 may pass through the cooking utensil. At this time, by the magnetic field passing through the cooking utensil, an eddy current may be formed in the cooking utensil, and the cooking utensil itself is heated as the eddy current flows through the cooking utensil, so that the contents of the cooking utensil may be heated.

In addition, even in the case of a small cooking appliance such as a wireless electric pot that does not have a receiving coil 210 for receiving power, a heating unit of the small cooking appliance may be heated by the current flowing through the transmitting coil 150 of the wireless power transfer apparatus 100.

That is, the wireless power transfer apparatus 100 may operate as a power supply device that supplies power to the wireless power reception apparatus 200, or an induction type cooking appliance that heats the cooking utensil through an electromagnetic induction heating method.

Figure 2B:
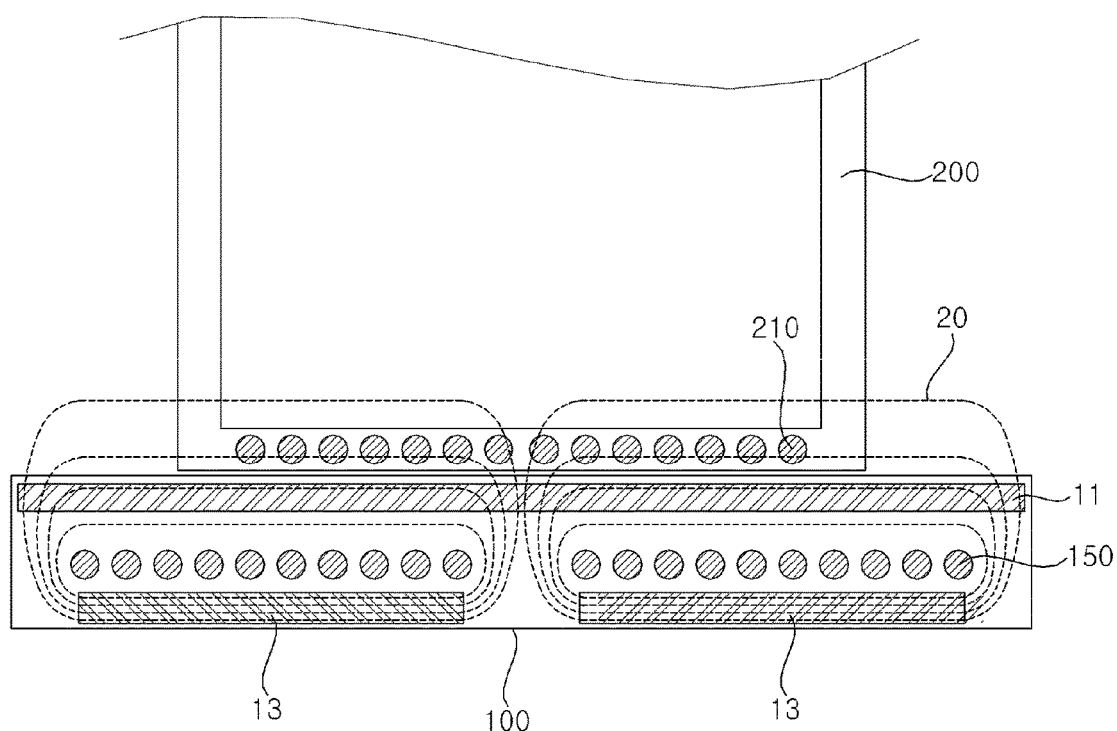

FIGS. 2A and 2B are diagrams referred to for explanation of an embodiment of components included in the wireless power system.

FIG. 2A is an example of a top perspective view of a wireless power transfer apparatus 100 and a wireless power reception apparatus 200, and FIG. 2B is an example of a cross-sectional view of a wireless power transfer apparatus 100 and a wireless power reception apparatus 200.

Referring to FIGS. 2A and 2B, the wireless power reception apparatus 200 may be located adjacent to the wireless power transfer apparatus 100 and receive power wirelessly from the wireless power transfer apparatus 100.

As shown in FIG. 2B, the wireless power transfer apparatus 100 may include a top glass 11, and the wireless power reception apparatus 200 may be located on the top glass 11.

The top glass 11 may be configured to protect the interior of the wireless power transfer apparatus 100 and support the wireless power reception apparatus 200. For example, the top glass 11 may be formed of tempered glass made of a ceramic material synthesized from various minerals.

The transmitting coil 150 may be disposed close to the lower portion of the top glass 11.

The magnetic field 20 may be generated by the current flowing through the transmitting coil 150 of the wireless power transfer apparatus 100, and a current may be induced in the receiving coil 210 of the wireless power reception apparatus 200 by the magnetic field 20.

The wireless power transfer apparatus 100 may further include a ferrite 13. The ferrite 13 may be made of a material having high permeability. The ferrite 13 may be disposed inside the wireless power transfer apparatus 100.

The ferrite 13 may induce the magnetic field 20 generated from the transmitting coil 150 to flow through the ferrite 13 without being radiated in order to reduce the leakage magnetic field and maximize the direction of the magnetic field.

The wireless power reception apparatus 200 may receive power through the magnetic field 20 generated by the current flowing through the transmitting coil 150.

The wireless power reception apparatus 200 may supply power to each component included in the wireless power reception apparatus 200 by using the power received through the receiving coil 210 and control operations of each component. For example, as shown in FIG. 2A, when the wireless power reception apparatus 200 is a blender, a motor and a blade as the load 240 may be rotated by using the power received through the receiving coil 210.

Figure 3A:
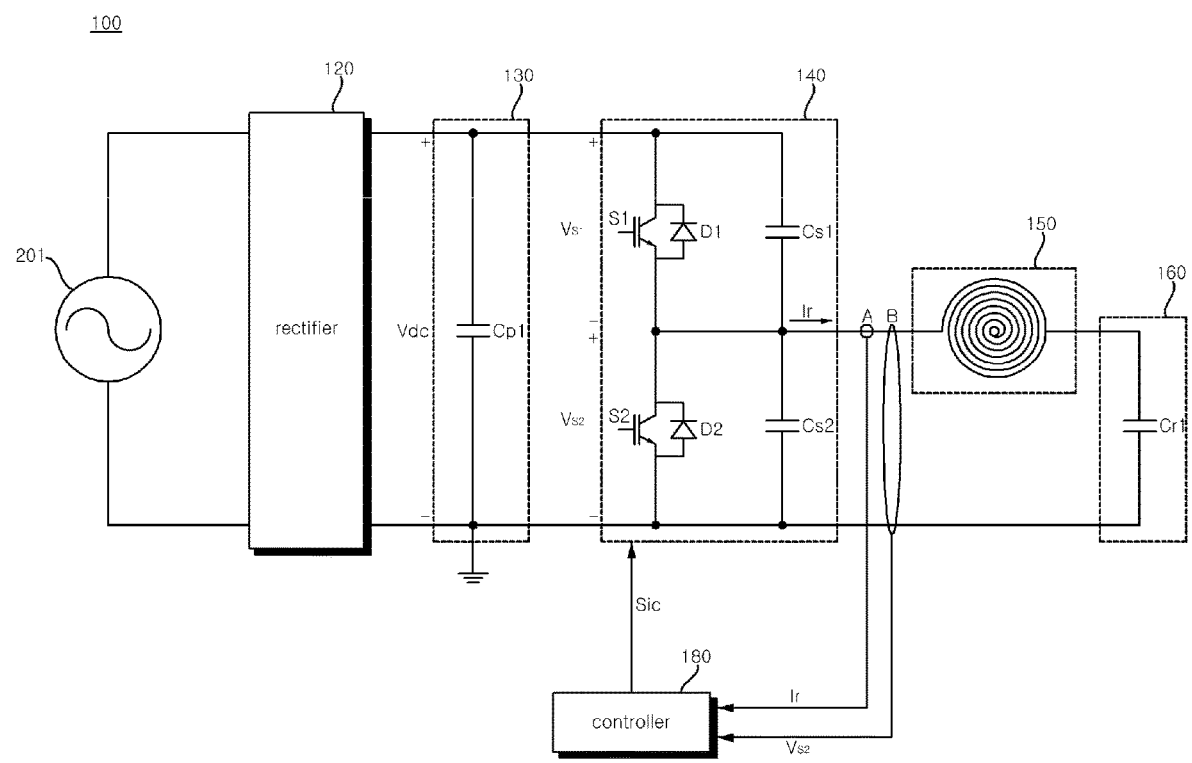
FIGS. 3A and 3B are internal circuit diagrams of the wireless power transfer apparatus of FIG. 1.
Figure 3B:
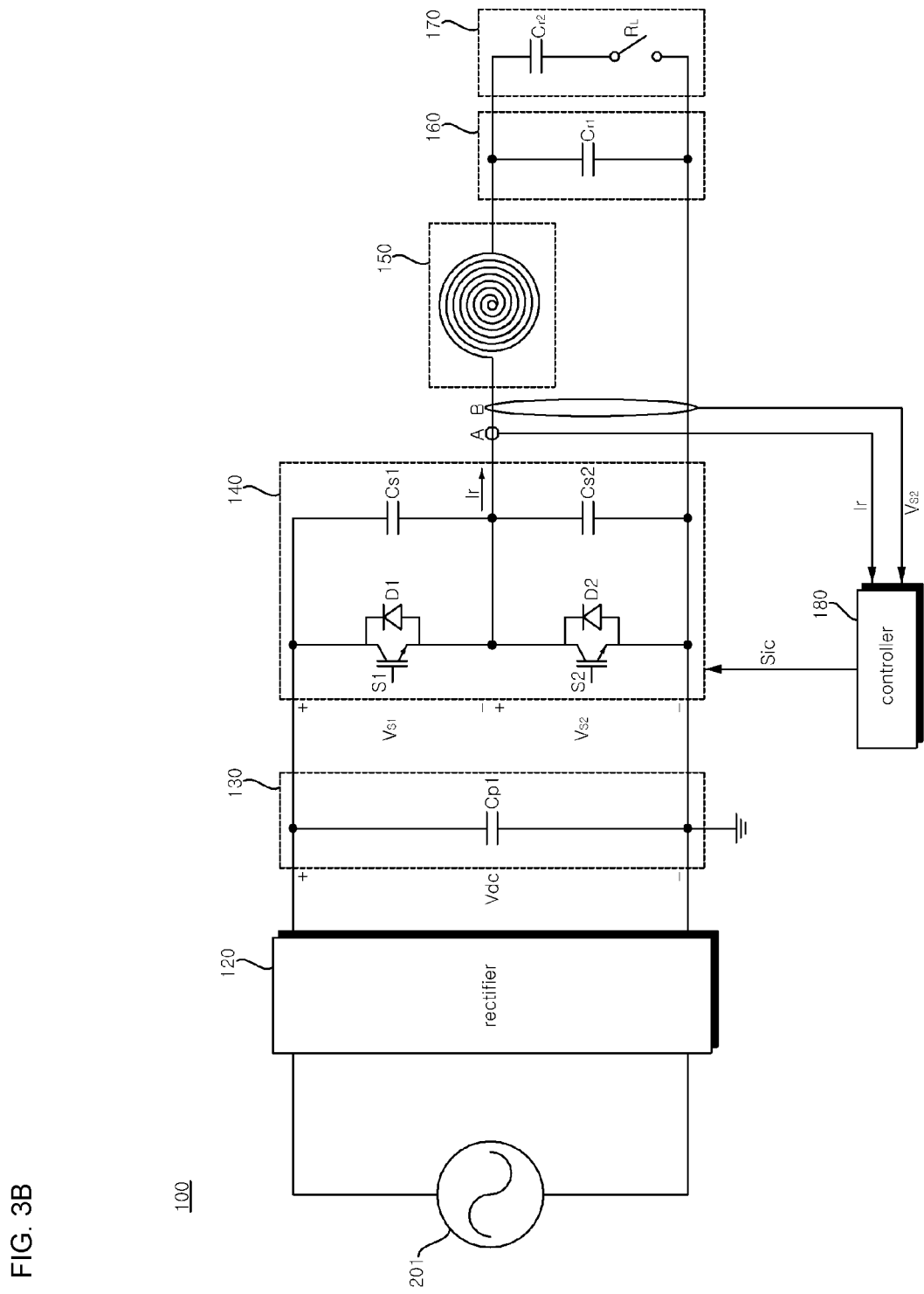

FIGS. 3A and 3B are internal circuit diagrams of the wireless power transfer apparatus of FIG. 1.

Referring to FIGS. 3A and 3B, the wireless power transfer apparatus 100 may include a rectifier 120 connected to an external power source, a DC capacitor 130, an inverter 140, a transmitting coil 150, a resonator 160, and/or a controller 170. The rectifier 120 may rectify power input from a commercial power supply 201, which is an external power source. The rectifier 120 may convert an alternating current (AC) voltage supplied through the commercial power supply 201 into a direct current (DC) voltage. In this situation, the commercial power supply 201 may be a single-phase AC power or a three-phase AC power. For example, the rectifier 120 may include a bridge diode having two or three pairs of upper arm diode elements and lower arm diode elements that are connected in series to each other. The rectifier 120 may further include a plurality of switching elements.

The DC capacitor 130 may be connected to a DC terminal, which is an output terminal of the rectifier 120, and may store DC power supplied from the rectifier 120.

In the drawing, one element Cp1 is shown as the DC capacitor 130, but the present disclosure is not limited thereto, and a plurality of elements may be provided to ensure device stability.

The inverter 140 may include a plurality of switching elements S1 and S2. The inverter 140 may convert the DC power stored in the DC capacitor 130 into AC power of a predetermined frequency according to an operation of the switching elements S1 and S2 and output the converted AC power to the transmitting coil 150. For example, when the switching elements S1 and S2 are insulated gate bipolar transistor (IGBT), driving signal generated by the pulse width modulation (PWM) signal may be input to the gate terminals of the switching elements S1 and S2. In this situation, by turning on/off the switching elements S1 and S2 according to the driving signal, the high-frequency current is output from the inverter 140 and may flow through the transmitting coil 150.

When the high-frequency current output from the inverter 140 flows through the transmitting coil 150, a magnetic field may be generated in the transmitting coil 150. In addition, a current of a predetermined frequency may be induced in the receiving coil 210 of the wireless power reception apparatus 200 by the magnetic field generated by the transmitting coil 150.

The inverter 140 may further include a plurality of snubber capacitors Cs1 and Cs2. The plurality of snubber capacitors Cs1 and Cs2 may be connected to the plurality of switching elements S1 and S2, respectively.

The snubber capacitors Cs1 and Cs2 may be included to reduce the inrush current or transient a voltage generated in the switching elements S1 and S2, and in some cases may be used for removing electromagnetic noise.

The snubber capacitors Cs1 and Cs2 may affect energy loss during turn-off by adjusting a rate of increase of the saturation voltage during turn-off of the switching elements S1 and S2.

The transmitting coil 150 may have a round shape, a circular sector shape, or a polygonal shape such as a triangular shape or a square shape, but the present disclosure is not limited thereto.

The resonator 160 may include a first resonant capacitor Cr1 connected between the DC terminal, which is the output terminal of the rectifier 120 and the transmitting coil 150. For example, the first resonant capacitor Cr1 may have one end connected to the transmitting coil 150 and the other end connected to the DC capacitor 130.

A resonant frequency of power transmission may be determined according to a capacitance of the resonator 160. For example, the resonant frequency of power transmission may be determined according to an inductance of the transmitting coil 150 and the capacitance of the resonator 160.

A resonance curve may be formed around the resonant frequency determined by the inductance of the transmitting coil 150 and the capacitance of the resonator 160. Here, the resonance curve may be a curve representing output power according to frequency.

According to the inductance of the transmitting coil 150 and the capacitance of the resonator 160, a quality factor Q may be determined, and the resonance curve may be formed differently according to the quality factor Q.

Accordingly, according to the inductance of the transmitting coil 150 and the capacitance of the resonator 160, the wireless power transfer apparatus 100 may have different output characteristics, and the frequency at which the maximum power is output may be referred to as the resonant frequency.

Meanwhile, the resonator 160 may include a plurality of the first resonant capacitors Cr1. In this situation, the capacitances of the plurality of first resonant capacitors Cr1 may be the same.

For example, any one of the plurality of first resonant capacitors Cr1 may have one end connected to one end of the DC capacitor 130 and the other end connected to the transmitting coil 150, and the other one of the plurality of first resonant capacitors Cr1 may have one end connected to the other end of the DC capacitor 130 and the other end connected to the transmitting coil 150, The wireless power transfer apparatus 100 may use a frequency band higher than the resonant frequency based on the resonant frequency of the resonance curve. The wireless power transfer apparatus 100 may increase a level of transmitted power by decreasing a frequency within the frequency band or decrease a level of transmitted power by increasing the frequency. For example, the wireless power transfer apparatus 100 may determine any one of the frequencies in the frequency band of 20 kHz to 75 kHz as a switching frequency of the switching elements S1 and S2 included in the inverter 140, and control the switching elements S1 and S2 to be alternately turned on/off according to the determined switching frequency.

When the wireless power transfer apparatus 100 operates as the induction type cooking appliance, the wireless power transfer apparatus 100 may increase a thermal power stage by decreasing the frequency or decrease the thermal power stage by increasing the frequency.

Meanwhile, as shown in FIG. 3B, the wireless power transfer apparatus 100 may further include a second resonator 170.

The second resonator 170 may include a changeover switch RL and a second resonant capacitor Cr2. The second resonator 170 may be connected in parallel to the resonator 160.

The changeover switch RL may be turned on/off according to the control of the controller 180. In this drawing, the changeover switch RL is shown to be a relay that turns on/off based on the current flowing through a coil, but the present disclosure is not limited thereto, and the changeover switch RL may be a transistor. For example, the changeover switch RL may be a Bipolar Junction Transistor (BJT) or a Field Effective Transistor (FET).

The second resonant capacitor Cr2 may be connected in parallel to the first resonant capacitor Cr1 according to an operation of the changeover switch RL. For example, the second resonant capacitor Cr2 may be connected in parallel to the first resonant capacitor Cr1 when the changeover switch RL is turned on.

The second resonator 170 may be configured to change the resonant frequency of the wireless power transfer apparatus 100.

More specifically, when the second resonant capacitor Cr2 is connected in parallel to the first resonant capacitor Cr1 according to the operation of the changeover switch RL, a composite capacitance of the first resonant capacitor Cr1 and the second resonant capacitor Cr2 may increase, and as the composite capacitance increases, the resonant frequency of the wireless power transfer apparatus 100 may decrease.

The changeover switch RL may be turned on/off according to an operation mode of the wireless power transfer apparatus 100. For example, when the operation mode of the wireless power transfer apparatus 100 is a power transmission mode in which power is transmitted wirelessly, the changeover switches RL may be turned on so that the resonant frequency of the wireless power transfer apparatus 100 decreases. For example, when the operation mode of the wireless power transfer apparatus 100 is an induction heating mode in which the wireless power transfer apparatus 100 operates as the induction cooking appliance, the changeover switch RL may be turned off so that the resonant frequency of the wireless power transfer apparatus 100 increases compared to the power transmission mode.

Meanwhile, when the resonator 160 includes a plurality of the first resonant capacitors Cr1, the second resonator 170 may include a plurality of the second resonant capacitors Cr2 and a plurality of the changeover switches RL. In this situation, capacitances of the plurality of second resonant capacitors Cr2 may be the same.

The plurality of second resonant capacitors Cr2 may be disposed to be connected in parallel to the plurality of first resonant capacitors Cr1, respectively. In this situation, the plurality of changeover switches RL may be connected in series to the plurality of second resonant capacitors Cr2 so that when the plurality of changeover switches RL are turned on, the plurality of second resonant capacitors Cr2 are connected in parallel to the plurality of first resonant capacitors Cr1.

The plurality of changeover switches RL may be turned on/off at the same time according to the control of the controller 180.

The controller 180 may be connected to each component included in the wireless power transfer apparatus 100 and control the operation of each component overall.

The controller 180 may determine the operation mode of the wireless power transfer apparatus 100. For example, the controller 180 may determine the operation mode of the wireless power transfer apparatus 100 according to a user input.

The wireless power transfer apparatus 100 may further include an input unit. The input unit may include various switches for operating the operation of the wireless power transfer apparatus 100. For example, the input unit may include an operation switch for turning on/off the wireless power transfer apparatus 100 or selecting the operation mode.

The controller 180 may determine the operation mode of the wireless power transfer apparatus 100 according to a user input received through the input unit.

The controller 180 may control the inverter 140 so that a current, which is an alternating current, flows through the transmitting coil 150. At this time, the controller 180 may control the inverter 140 according to the operation mode of the wireless power transfer apparatus 100. For example, when the operation mode of the wireless power transfer apparatus 100 is the power transmission mode, the controller 180 may control on/off operations of the switching elements S1 and S2 so that power is transmitted to the wireless power reception apparatus 200 through the transmitting coil 150. For example, when the operation mode of the wireless power transfer apparatus 100 is the induction heating mode, the controller 180 may control on/off operations of the switching elements S1 and S2 so that the magnetic field used to heat the cooking utensil is generated.

The controller 180 may include a PWM generator that generates a pulse width modulation (PWM) signal and a driver that generates a driving signal Sic based on the PWM signal and outputs it to the switching elements S1 and S2 of the inverter 140.

The controller 180 may calculate a level of power transmitted through the transmitting coil 150. Hereinafter, the level of power transmitted through the transmitting coil 150 may be referred to as an output level.

The controller 180 may calculate the output level based on the current output from the inverter 140 and flowing through the transmitting coil 150 and a voltage applied to an output terminal of the inverter 140.

The wireless power transfer apparatus 100 may further include a current detector A for detecting the current output from the inverter 140 and a voltage detector B for detecting the voltage applied to the output terminal of the inverter 140.

The current detector A may include a current transformer, a shunt resistor, etc. to detect the current output from the inverter 140, and the detected current Ir may be input to the controller 180. For example, a detection value for the current Ir detected through the current detector A may be input to the controller 180 as a discrete signal in the form of a pulse.

The voltage detector B may include a voltage transformer, a resistor, an OP AMP, or the like to detect the voltage applied to the output terminal of the inverter 140. A detection value for the voltage Vs2 detected through the voltage detector B may be input to the controller 180. For example, the detection value for the voltage Vs2 may be input to the controller 180 as a discrete signal in the form of a pulse.

The wireless power transfer apparatus 100 may further include a communication unit. The communication unit may include at least one communication module for communication with the wireless power reception apparatus 200. In some examples, the communication unit may include an electric circuit or electric components such as terminals, resistors, capacitors, switches, or the like.

Hereinafter, in order to distinguish between the communication unit included in the wireless power transfer apparatus 100 and a communication unit included in the wireless power reception apparatus 200, the communication unit included in the wireless power transfer apparatus 100 may be referred to as a transmitting-side communication unit, and the communication unit included in the wireless power reception apparatus 200 may be referred to as a receiving-side communication unit.

The transmitting-side communication unit may include first and second transmitting-side communication units.

The first transmitting-side communication unit may communicate with a first communication method. The first transmitting-side communication unit may transmit a signal including data on a state of the device, data on power consumption, and the like to the wireless power reception apparatus 200 and receive a signal including data on a state of the device, data on power consumption, data on battery charging, and the like from the wireless power reception apparatus 200.

The second transmitting-side communication unit may communicate with the wireless power reception apparatus 200 in a second communication method different from the first communication method. The second transmitting-side communication unit may transmit a signal including data on a state of the device, data on power consumption, and the like to the wireless power reception apparatus 200 and receive a signal including data on a state of the device, data on power consumption, data on battery charging, and the like from the wireless power reception apparatus 200.

The first communication method may be the in-band communication method. For example, when the first transmitting-side communication unit communicates in the in-band communication method, the first transmitting-side communication unit and the transmitting coil 150 may be implemented in one configuration, and the first transmitting-side communication unit may communicate with the wireless power reception apparatus 200 through the transmitting coil 150.

The second communication method may be the out-of-band communication method. For example, when the second transmitting-side communication unit communicates in the out-of-band communication method, the second transmitting-side communication unit and the transmitting coil 150 may be implemented in separate configurations, and the second transmitting-side communication unit may communicate with the wireless power reception apparatus 200 through a separate communication module different from the transmitting coil 150.

The first and second transmitting-side communication units may further include a modulation/demodulation unit that modulates a signal transmitted from the wireless power transfer apparatus 100 and demodulates a signal received from the wireless power reception apparatus 200.

The first and second transmitting-side communication units may further include a filter unit that filters a signal received from the wireless power reception apparatus 200. In this situation, the filter unit may include a band pass filter (BPF).

According to an embodiment, a communication module used in the out-of-band communication method may use a short-range communication method such as Bluetooth, Zigbee, Wireless LAN, NFC (Near Field Communication), but the present disclosure is not limited thereto.

Meanwhile, the communication method used in the wireless power transfer apparatus 100 may be changed to at least one of the first and second communication methods based on data on the wireless power reception apparatus 200 and the like.

The controller 180 may transmit and receive data to and from the wireless power reception apparatus 200 through the transmitting-side communication unit.

The controller 180 may control the inverter 140 based on a command value for power transmitted through the transmitting coil 150. Hereinafter, the command value may be referred to as a target level.

The controller 180 may compare the output level of the power transmitted through the transmitting coil 150 and the target level for the power transmitted through the transmission coil 150 and control the inverter 140 according to a result of comparing the output level and the target level.

For example, when the output level is lower than the target level, the controller 180 may control the inverter 140 so that the output level reaches the target level. In this situation, the controller 180 may decrease the switching frequency of the switching elements S1 and S2 of the inverter 140 so as to increase the output level.

For example, when the output level is higher than the target level, the controller 180 may control the inverter 140 so that the output level reaches the target level. In this situation, the controller 180 may increase the switching frequency of the switching elements S1 and S2 of the inverter 140 so as to decrease the output level.

For example, when the output level corresponds to the target level, the controller 180 may control the inverter 140 so that the output level is maintained. In this situation, the controller 180 may maintain the switching frequency of the switching elements S1 and S2 of the inverter 140 so that the output level is maintained.

The controller 180 may receive data on the target level from the wireless power reception apparatus 200 through the transmitting-side communication unit and may determine the target level based on the data on the target level. For example, when receiving data specifying a specific level from the wireless power reception apparatus 200, the controller 180 may change the target level to a specific level. For example, the controller 180 may increase the target level by a preset level from the current target level when data requesting an increase of the target level is received from the wireless power reception apparatus 200 and decrease the target level by a preset level from the current target level when data requesting reduction of the target level is received from the wireless power reception apparatus 200.

In this situation, the controller 180 may increase the target level by a predetermined first level from the current target level when the data requesting the increase in the target level is received from the wireless power reception apparatus 200 and decrease the target level by a predetermined second level from the current target level when data requesting reduction of the target level is received from the wireless power reception apparatus 200. Here, the first level may be set smaller than the second level. Through this, when there is a possibility of applying an overvoltage to a DC capacitor of the wireless power reception apparatus 200, it is possible to more quickly prevent damage to elements included in the wireless power reception apparatus 200 due to application of the overvoltage by reducing the output level larger compared to increasing the output level.

The controller 180 may determine an operating state of the wireless power reception apparatus 200. For example, the controller 180 may determine whether the overvoltage is applied to the wireless power reception apparatus 200 based on data on a voltage applied to the DC capacitor of the wireless power reception apparatus 200 received from the wireless power reception apparatus 200. For example, the controller 180 may determine whether the overvoltage is applied to the wireless power reception apparatus 200 based on data on the overvoltage received from the wireless power reception apparatus 200

The controller 180 may determine a state of a load 240 of the wireless power reception apparatus 200. For example, when the state of the load 240 of the wireless power reception apparatus 200 rapidly changes from a full-load state to a light-load state or a no-load state, efficiency of power transmission/reception between the wireless power transfer apparatus 100 and the wireless power reception apparatus 200 may be rapidly lowered. In addition, changes such as a decrease in the current flowing through the transmitting coil 150 of the wireless power transfer apparatus 100 may occur, and as a result, the output level of power transmitted from the wireless power transfer apparatus 100 may be significantly lower than the target level. Hereinafter, the state of the load 240 may be referred to as a load state.

The controller 180 may determine the load state of the wireless power reception apparatus 200 based on data indicating the load state received from the wireless power reception apparatus 200.

The controller 180 may determine the load state of the wireless power reception apparatus 200 based on the output level and the target level. For example, when the target level is higher than the output level and the difference between the target level and the output level is higher than or equal to a predetermined difference, the controller 180 may determine the load state of the wireless power reception apparatus 200 as abnormal. For example, when the target level is higher than or equal to a first reference level and the output level is lower than a second reference level, the controller 180 may determine the load state of the wireless power reception apparatus 200 as abnormal. In this situation, the first reference level may be higher than the second reference level.

Here, the predetermined difference and/or the first and second reference levels, which are criteria for determining the load state of the wireless power reception apparatus 200, may be variously changed according to settings.

The controller 180 may control the inverter 140 according to the load state of the wireless power reception apparatus 200.

When the load state of the wireless power reception apparatus 200 is normal, the controller 180 may control the inverter 140 according to the target level. For example, when the load state of the wireless power reception apparatus 200 is normal, the controller 180 may control the inverter 140 so that the output level reaches the target level.

When the load state of the wireless power reception apparatus 200 is abnormal, the controller 180 may control the inverter 140 according to a predetermined power level lower than the target level. For example, when the load state of the wireless power reception apparatus 200 is abnormal, the controller 180 may control the inverter 140 so that the output level is maintained corresponding to the predetermined power level lower than the target level.

The wireless power transfer apparatus 100 may further include an output unit. The output unit may include a display device such as a display and a light emitting diode (LED), and/or an audio device such as a speaker and a buzzer.

The controller 160 may output a message for the wireless power transfer apparatus 100 through the output unit. For example, the controller 160 may output a message regarding the operation mode of the wireless power transfer apparatus 100 through the display.

The controller 160 may output a message for the wireless power reception apparatus 200 through the output unit. For example, when the load state of the wireless power reception apparatus 200 is abnormal, the controller 160 may output a warning message regarding the load state of the wireless power reception apparatus 200 through the speaker.

Figure 4:
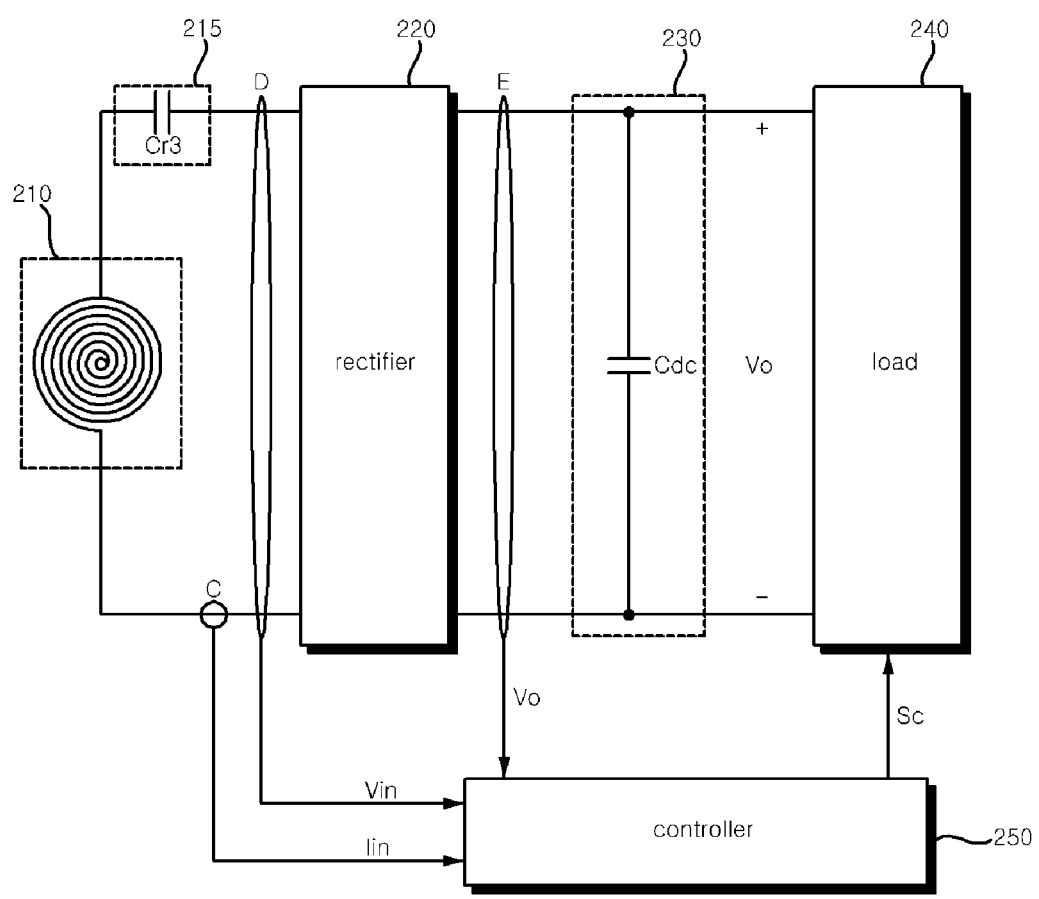
FIG. 4 is an internal circuit diagram of the wireless power reception apparatus of FIG. 1.

FIG. 4 is an internal circuit diagram of the wireless power reception apparatus of FIG. 1.

Referring to FIG. 4, the wireless power reception apparatus 200 may include a receiving coil 210, a resonator 215, a rectifier 220, a DC capacitor 230, and/or a load 240.

The receiving coil 210 may receive power transmitted from the wireless power transfer apparatus 100. For example, a current of a predetermined frequency may be induced in the receiving coil 210 by a magnetic field generated in the transmitting coil 150 of the wireless power transfer apparatus 100, and induced electromotive force according to the induced current may be supplied as power for the operation of the wireless power reception apparatus 200.

The resonator 215 may include a third resonant capacitor Cr3 for forming a resonant circuit with the wireless power transfer apparatus 100. The third resonance capacitor Cr3 may be connected in series to the receiving coil 210.

The resonant frequency of power reception may be determined according to the capacitance of the resonator 215. For example, the resonant frequency of power reception may be determined according to the inductance of the receiving coil 210 and the capacitance of the resonator 215.

In this situation, the resonant frequency of power transmission and the resonant frequency of power reception may be the same, and an induced current having the same frequency as the frequency of the current flowing through the transmitting coil 150 may flow through the receiving coil 210.

The rectifier 220 may rectify power delivered from the receiving coil 210. The rectifier 220 may convert an alternating current induced in the receiving coil 210 by a magnetic field generated in the transmitting coil 150 into a direct current.

The rectifier 120 may include a bridge diode. The rectifier 120 may further include a plurality of switching elements.

Meanwhile, elements included in the rectifier 220 of the wireless power reception apparatus 200 may be different from elements included in the rectifier 120 of the wireless power transfer apparatus 100. For example, the elements included in the rectifier 220 of the wireless power reception apparatus 200 may be elements corresponding to a high frequency (e.g. 32 kHz) power received through the receiving coil 210, the elements included in the rectifier 120 of the wireless power transfer apparatus 100 may be elements corresponding to a low frequency (e.g. 60 Hz) power supplied through the commercial power supply 201.

The DC capacitor 230 may be connected to a DC terminal, which is an output terminal of the rectifier 220, and may store DC power supplied from the rectifier 220.

The DC capacitor 230 may be connected to an input terminal of the load 240.

In the drawing, one element Cdc is shown as the DC capacitor 230, but the present disclosure is not limited thereto, and a plurality of elements may be provided to ensure device stability.

The load 240 may be configured to operate based on power stored in the DC capacitor 230.

For example, the load 240 may be a battery that is charged based on power stored in the DC capacitor 230.

For example, the load 240 may include an inverter that includes a plurality of switching elements and converts DC power stored in the DC capacitor 230 into AC power having a predetermined frequency.

In this situation, the load 240 may further include a motor driven by the AC power, a working coil that generates a magnetic field, and the like.

For example, when the wireless power reception apparatus 200 is a blender, the load 240 may further include the motor. In addition, the wireless power reception apparatus 200 may grind food by rotating a blade connected to the motor that rotates by AC power output from the inverter.

For example, when the wireless power reception apparatus 200 is a mini oven, the load 240 may further include the working coil. In addition, the wireless power reception apparatus 200 may heat food in a cook utensil by heating the cook utensil disposed adjacent to the working coil through the working coil that generates a magnetic field by AC power output from the inverter.

The wireless power reception apparatus 200 may further include the receiving-side communication unit for communicating with the wireless power transfer apparatus 100.

The receiving-side communication unit may further include a first receiving-side communication unit and a second receiving-side communication unit. In this situation, the first receiving-side communication unit may have the same or similar configuration as the first transmitting-side communication unit included in the wireless power transfer apparatus 100, and the second receiving-side communication unit may have the same or similar configuration as the second transmitting-side communication unit included in the wireless power transfer apparatus 100.

For example, the wireless power reception apparatus 200 may communicate with the wireless power transfer apparatus 100 through the in-band communication method through the first receiving-side communication unit.

For example, the wireless power reception apparatus 200 may communicate with the wireless power transfer apparatus 100 through the out-of-band communication method through the second receiving-side communication unit.

The wireless power reception apparatus 200 may further include a controller 250 connected to each component included in the wireless power reception apparatus 200 and controlling the overall operation of each component. In order to distinguish the controller 250 from the controller 180 included in the wireless power transfer apparatus 100, the controller 250 may be referred to as a receiving-side controller.

The receiving-side controller 250 may control the operation of the load 240. For example, when the load 240 includes the inverter and the motor, the receiving-side controller 250 may control rotation of the motor by outputting a control signal Sc that controls a switching operation of a plurality of switching elements included in the inverter of the load 240.

The receiving-side controller 250 may transmit and receive data to and from the wireless power transfer apparatus 100 through the receiving-side communication unit.

For example, the receiving-side controller 250 may transmit and receive data on a state of the device, data on power consumption, data on battery charging and the like to and from the wireless power transfer apparatus 100.

The wireless power reception apparatus 200 may further include a current detector C for detecting current flowing through the receiving coil 210, a first voltage detector D detecting a voltage applied to an input terminal of the rectifier 220, and/or a second voltage detector E detecting a voltage applied to the DC capacitor 230.

The current detector C may include a current transformer, a shunt resistor, etc. to detect the current flowing through the receiving coil 210, and the detected current Iin may be input to the receiving-side controller 250. For example, a detection value for the current Iin detected through the current detector C may be input to the receiving-side controller 250 as a discrete signal in the form of a pulse.

The first voltage detector D may include a voltage transformer, a resistor, an OP AMP, or the like to detect the voltage applied to the input terminal of the rectifier 220. A detection value for the voltage Vin detected through the first voltage detector D may be input to the receiving-side controller 250. For example, the detection value for the voltage Vin may be input to the receiving-side controller 250 as a discrete signal in the form of a pulse.

The second voltage detector D may include a voltage transformer, a resistor, an OP AMP, or the like to detect a DC terminal voltage applied to the DC capacitor 230. A detection value for the DC terminal voltage Vo detected through the second voltage detector E may be input to the receiving-side controller 250. For example, the detection value for the DC terminal voltage Vo may be input to the receiving-side controller 250 as a discrete signal in the form of a pulse.

The receiving-side controller 250 may calculate a voltage applied to each component of the wireless power reception apparatus 200, a current flowing through each component of the wireless power reception apparatus 200 and/or power, based on the at least one detection value detected through the current detector C, the first voltage detector D and/or the second voltage detector E. For example, the receiving-side controller 250 may calculate the DC terminal voltage Vo based on the detected value detected through the second voltage detector E.

The receiving-side controller 250 may transmit data on the voltage applied to each component of the wireless power reception apparatus 200, the current flowing through each component of the wireless power reception apparatus 200 and/or the power to the wireless power transfer apparatus 100 through the receiving-side communication unit. For example, the receiving-side controller 250 may calculate the power transmitted from the wireless power transfer apparatus 100 based on the detection values detected through the current detector C and the first voltage detector D.

The receiving-side controller 250 may determine the target level and transmit data on the target level to the wireless power transfer apparatus 100. For example, the receiving-side controller 250 may determine power required for the operation of the load 240 according to an operation mode of the wireless power reception apparatus 200 and transmit data designating a specific target level required for the operation of the load 240 to the wireless power transfer apparatus 100.

The receiving-side controller 250 may determine the target level based on the DC terminal voltage Vo. For example, the receiving-side controller 250 may determine the target level so that a predetermined reference voltage is constantly applied to the DC capacitor 230. In this situation, the reference voltage may be determined according to specifications of components included in the wireless power reception apparatus 200.

The receiving-side controller 250 may determine the target level such that the DC terminal voltage Vo is maintained within a voltage range (e.g. 210V to 230V) set according to the reference voltage (e.g. 220V).

For example, when the DC terminal voltage Vo is higher than the voltage range (e.g. 210V to 230V) set according to the reference voltage (e.g. 220V), the receiving-side controller 250 may determine a level lower than a previous target level as the target level.

For example, when the DC terminal voltage Vo is lower than the voltage range (e.g. 210V to 230V) set according to the reference voltage (e.g. 220V), the receiving-side controller 250 may determine a level higher than the previous target level as the target level.

For example, when the DC terminal voltage Vo is included in the voltage range (e.g. 210V to 230V) set according to the reference voltage (e.g. 220V), the receiving-side controller 250 may maintain the previous target level as the target level.

In this situation, the wireless power reception apparatus 200 may designate the specific target level to be lower than a certain level from the previous target level and transmit it to the wireless power transfer apparatus 100. Through this, the target level may be sequentially increased or decreased, thereby improving a stability of the wireless power system 10.

For example, the receiving-side controller 250 may transmit data requesting an increase in the target level to the wireless power transfer apparatus 100 through the receiving-side communication unit when the power transmitted from the wireless power transfer apparatus 100 is lower than the power required for the operation of the load 240 and may transmit data requesting a reduction in the target level to the wireless power transfer apparatus 100 through the receiving-side communication unit when the power transmitted from the wireless power transfer apparatus 100 is higher than the power required for the operation of the load 240

In this situation, when data requesting an increase or decrease of the target level is received, the wireless power transfer apparatus 100 may change the target level so that the difference between the current target level and a next target level is lower than a predetermined level. Through this, the target level is sequentially increased or decreased, thereby improving the stability of the wireless power system 10.

Meanwhile, when the DC terminal voltage Vo exceeds a predetermined voltage value, the receiving-side controller 250 may determine that an overvoltage is applied. In this situation, the predetermined voltage value, which is a criterion for determining the application of the overvoltage, may be determined according to reference matters of components included in the wireless power reception apparatus 200.

When it is determined that the overvoltage is applied, the receiving-side controller 250 may transmit data on the overvoltage to the wireless power transfer apparatus 100 through the receiving-side communication unit. For example, when the load state of the wireless power reception apparatus 200 rapidly changes from the full-load state to the light-load state or the no-load state, the current flowing through the load 240 may be rapidly reduced, and the overvoltage exceeding the predetermined voltage value may be applied to the DC capacitor 230.

In this situation, the receiving-side controller 250 may transmit data on the overvoltage to the wireless power transfer apparatus 100 based on the DC terminal voltage Vo.

The wireless power reception apparatus 200 may further include an input unit. The input unit of the reception apparatus 200 may include various switches for operating the operation of the wireless power reception apparatus 200. For example, the input unit of the reception apparatus 200 may include an operation switch for turning on/off the reception apparatus 200 or selecting the operation mode.

The receiving-side controller 250 may determine the operation mode of the wireless power reception apparatus 200 according to a user input received through the input unit of the wireless power reception apparatus 200 and determine power required for the operation of the load 240 according to the operation mode of the wireless power reception apparatus 200.

Figure 5:
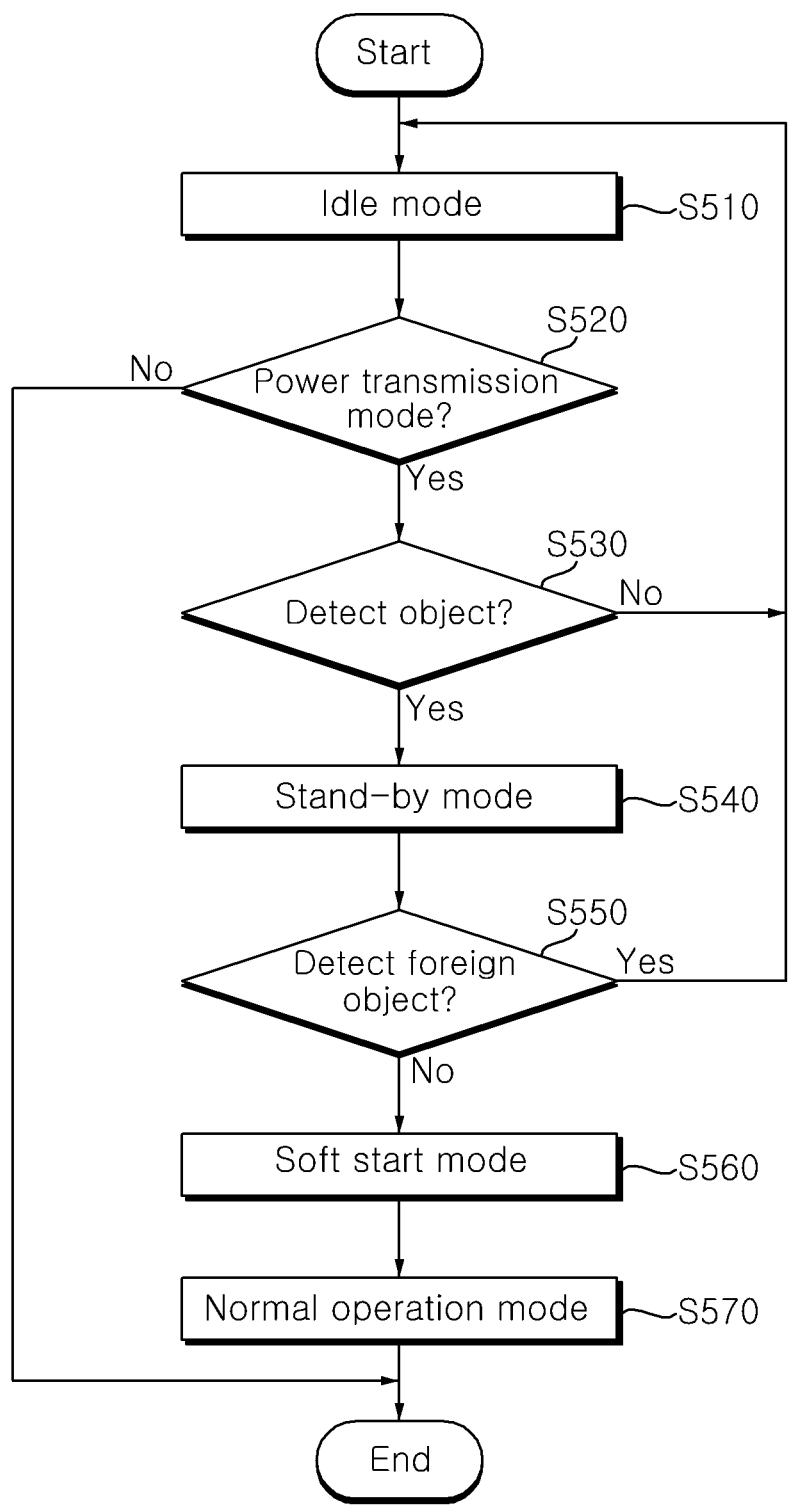
FIG. 5 is a flowchart for a process for power transmission of the wireless power transfer apparatus according to an embodiment of the present disclosure.
Figure 6:
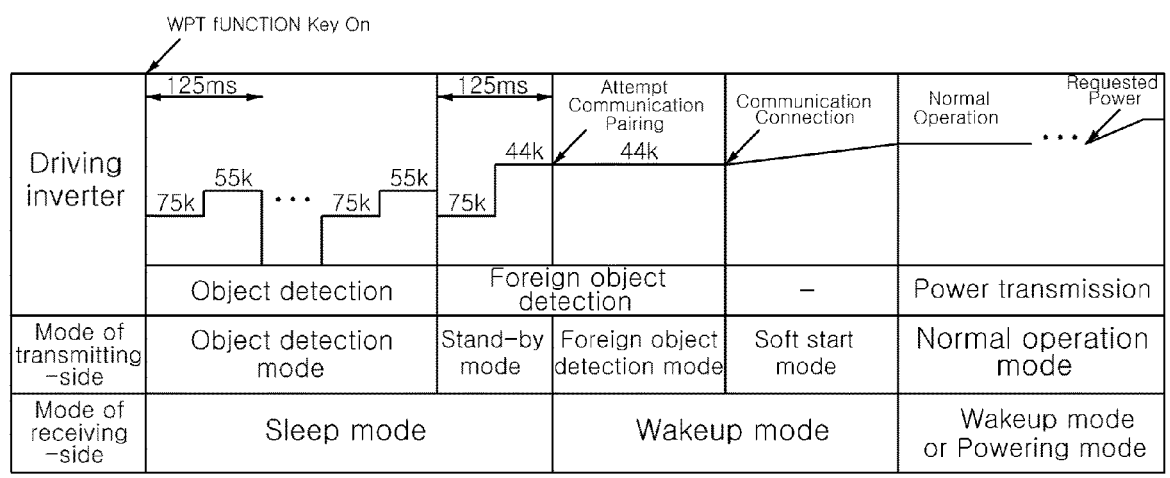
FIG. 6 is a view referred to for explanation of states of the wireless power transfer apparatus and the wireless power reception apparatus according to the flowchart of FIG. 5.

FIG. 5 is a flowchart for a process for power transmission of the wireless power transfer apparatus according to an embodiment of the present disclosure, and FIG. 6 is a view referred to for explanation of states of the wireless power transfer apparatus and the wireless power reception apparatus according to the flowchart of FIG. 5.

Referring to FIGS. 5 and 6, in operation S510, the wireless power transfer apparatus 100 may enter an idle mode.

In this situation, the idle mode may mean a mode in which power is applied to each component included in the wireless power transfer apparatus 100 and the controller 180 is activated, when the wireless power transfer apparatus 100 is turned on.

In operation S520, the wireless power transfer apparatus 100 may determine whether the operation mode of the wireless power transfer apparatus 100 is a power transmission mode. For example, the wireless power transfer apparatus 100 may determine the operation mode of the wireless power transfer apparatus 100 according to a user input received through an input unit included in the wireless power transfer apparatus 100.

In this situation, when the operation mode of the wireless power transfer apparatus 100 is not the power transmission mode, for example, in an induction heating mode, the wireless power transfer apparatus 100 may perform an operation corresponding to the induction heating mode.

In operation S530, when the operation mode of the wireless power transfer apparatus 100 is the power transmission mode, the wireless power transfer apparatus 100 may detect whether an object is located adjacent to the transmitting coil 150. For example, the wireless power transfer apparatus 100 may control the switching elements S1 and S2 included in the inverter 140 to be switched according to a first switching frequency (e.g. 75 kHz), so that a predetermined current flows through the transmitting coil 150, In this situation, the wireless power transfer apparatus 100 may determine whether the object located adjacent to the transmission coil 150 and/or the type of the object.

For example, based on the current flowing through the transmitting coil 150, the voltage applied to the transmitting coil 150, and the like, the wireless power transfer apparatus 100 may determine whether the object is located adjacent to the transmission coil 150 and whether the object is the wireless power reception apparatus 200 including the receiving coil 210, a small cooking appliance without the receiving coil 210 for receiving power, a general cooking utensil such as a pot, or a foreign object. In addition, for example, the wireless power transfer apparatus 100 may also determine a state in which the object is aligned with respect to the transmitting coil 150.

In operation S540, when the object is the wireless power reception apparatus 200 adjacent to the transmitting coil 150, the wireless power transfer apparatus 100 may enter a stand-by mode.

In this situation, the stand-by mode may mean a mode in which the switching frequency is changed from a first switching frequency (e.g. 75 kHz) for detecting an object to a second switching frequency (e.g. 44 kHz) before determining whether a foreign object (FO) is present adjacent to the transmission coil 150. For example, in the stand-by mode, the wireless power transfer apparatus 100 may control the inverter 140 so that the switching frequency is frequency-swept from the first switching frequency (e.g. 75 kHz) to the second switching frequency (e.g. 44 kHz) in the stand-by mode.

The reason for performing the stand-by mode between an object detection operation and a foreign object detection (FOD) operation is that driving noise may occur when the switching elements S1 and S2 switch according to the second switching frequency (e.g. 44 kHz) lower than the first switching frequency (e.g. 75 kHz) without the stand-by mode.

In operation S550, the wireless power transfer apparatus 100 may perform the foreign object detection (FOD) operation to determine whether a foreign object (FO) exists. For example, the wireless power transfer apparatus 100 may control the switching elements S1 and S2 to switch according to the second switching frequency (e.g. 44 kHz) so that the alternating current flows through the transmitting coil 150. In this situation, the second switching frequency (e.g. 44 kHz) may be a switching frequency when power capable of awakening the wireless power reception apparatus 200 is transmitted from the transmitting coil 150.

At that time, an induced current may flow through the receiving coil 210 of the wireless power reception apparatus 200, and power may be supplied to each of the components of the wireless power reception apparatus 200 to activate each of the components. In this situation, the mode of the wireless power reception apparatus 200 may be referred to as a wakeup mode, and a mode prior to the wakeup mode may be referred to as a sleep mode.

In addition, the wireless power transfer apparatus 100 may perform communication pairing with the activated wireless power reception apparatus 200 and may transmit and receive data with each other.

When it is determined that the object is not the wireless power reception apparatus 200 in operation S530, or when it is determined that there is the foreign object (FO) in operation S550, the wireless power transfer apparatus 100 may re-enter the idle mode in operation S510.

At this time, when it is determined that the object is not the wireless power reception apparatus 200 in operation S530, or when it is determined that there is the foreign object (FO) in operation S550, the wireless power transfer apparatus 100 may output a message for the object or the foreign object (FO) through the output unit of the wireless power transfer apparatus 100.

Meanwhile, in operation S560, the wireless power transfer apparatus 100 may enter a soft start mode when it is determined that there is no foreign object (FO).

In this situation, the soft start mode may mean a mode in which the output level is raised to a power level for normal operation of the wireless power reception apparatus 200. For example, the wireless power transfer apparatus 100 may increase the output level to a predetermined power level. Alternatively, for example, the wireless power transfer apparatus 100 may receive data on a power level from the wireless power reception apparatus 200 and may increase the output level according to the received power level.

At that time, the wireless power transfer apparatus 100 may decrease the switching frequency of the switching elements S1 and S2 of the inverter 140 so that the output level increases to the power level.

In operation S570, the wireless power transfer apparatus 100 may enter a normal operation mode when the output level is increased to the power level for normal operation of the wireless power reception apparatus 200.

In this situation, the normal operation mode may mean a mode in which the wireless power transfer apparatus 100 compares the output level and the target level and adjusts the output level according to the comparison result.

The wireless power transfer apparatus 100 may monitor a change in the target level in the normal operation mode.

The wireless power transfer apparatus 100 may receive data on the target level from the wireless power reception apparatus 200 and monitor a change in the target level based on the received data on the target level. For example, when data designating a specific target level required for the operation of the load 240 is received from the wireless power reception apparatus 200, the wireless power transfer apparatus 100 may maintain, increase or decrease the current target level by checking a difference between the current target level and the specific target level. For example, when data requesting an increase in the target level or data requesting a decrease in the target level is received from the wireless power reception apparatus 200, the wireless power transfer apparatus 100 may maintain, increase or decrease the current target level according to received data.

Meanwhile, in the normal operation mode, the wireless power transfer apparatus 100 may adjust the output level according to the target level. For example, when the output level is lower than the target level, the wireless power transfer apparatus 100 may decrease the switching frequency of the switching elements S1 and S2 of the inverter 140 so that the output level increases to the target level. For example, when the output level is higher than the target level, the wireless power transfer apparatus 100 may increase the switching frequency of the switching elements S1 and S2 of the inverter 140 so that the output level decreases to the target level. For example, when the output level corresponds to the target level, the wireless power transfer apparatus 100 may maintain the switching frequency of the switching elements S1 and S2 of the inverter 140 so that the output level is maintained.

In addition, when the current target level is changed, the wireless power transfer apparatus 100 may adjust the output level according to the changed target level.

In this regard, it will be described in detail with reference to FIGS. 7 and 8.

Figure 7:
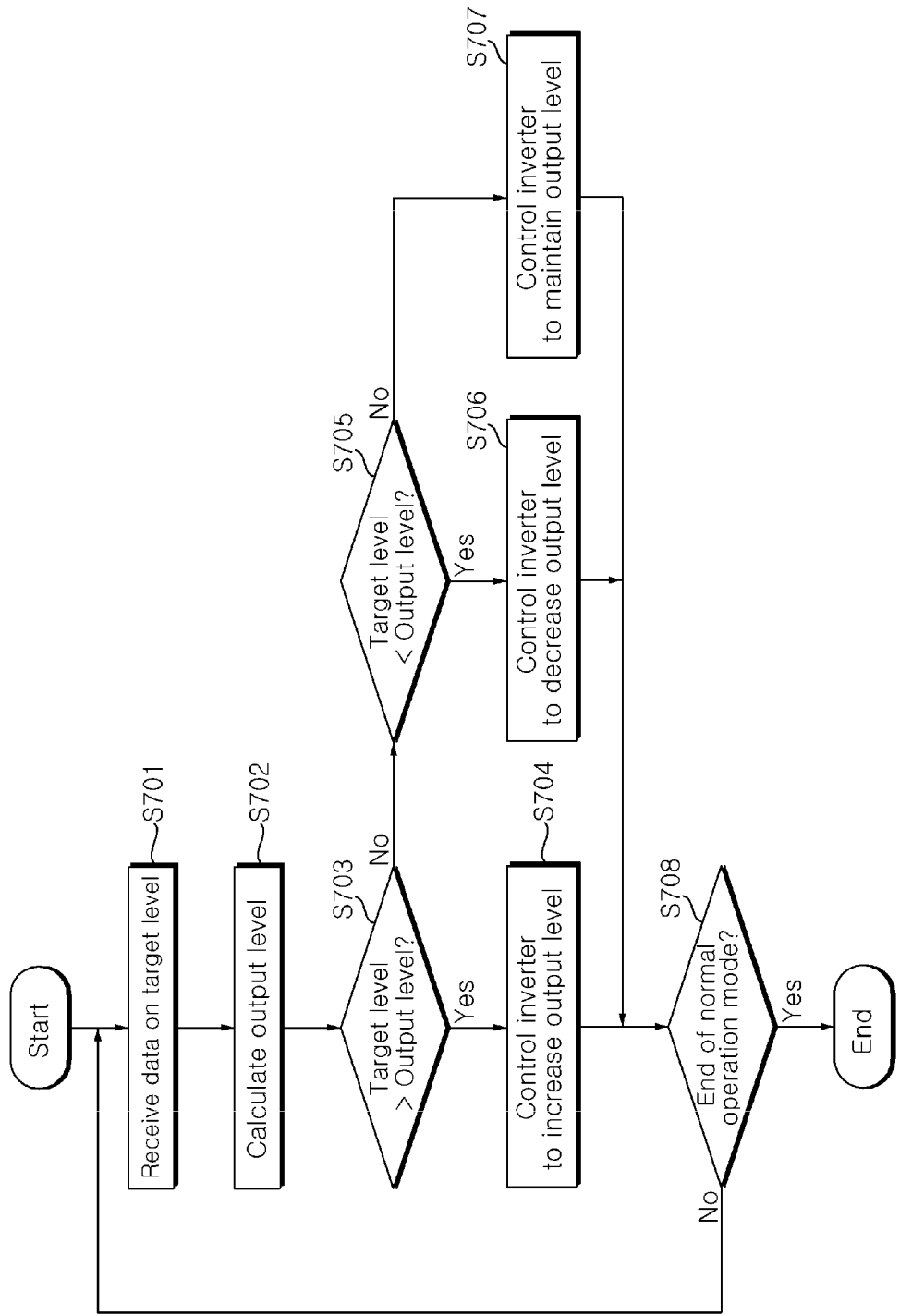
FIGS. 7 and 8 are flowcharts illustrating a method of operating the wireless power transfer apparatus according to various embodiments of the present disclosure.

FIG. 7 is an example of a flowchart of a method of operating the wireless power transfer apparatus according to an embodiment of the present disclosure.

Referring to FIG. 7, in operation S701, the wireless power transfer apparatus 100 may receive data on the target level from the wireless power reception apparatus 200. For example, the wireless power transfer apparatus 100 may receive data designating a specific level as the target level from the wireless power reception apparatus 200.

In operation S702, the wireless power transfer apparatus 100 may calculate the output level, which is the level of power transmitted through the transmitting coil 150. For example, the wireless power transfer apparatus 100 may calculate the output level based on the current flowing through the transmitting coil 150 and the voltage applied to the output terminal of the inverter 140.

In this drawing, although it is shown that the wireless power transfer apparatus 100 calculates the output level in operation S702, the present disclosure is not limited thereto. For example, when the wireless power transfer apparatus 100 is operating in the normal operation mode, the wireless power transfer apparatus 100 may monitor power transmitted through the transmitting coil 150 by continuously calculating the output level.

In operation S703, the wireless power transfer apparatus 100 may determine whether the output level is lower than the target level. In this situation, when the output level is lower than a power range set according to the target level, the wireless power transfer apparatus 100 may determine that the output level is lower than the target level.

In operation S704, when the target level is higher than the output level, the wireless power transfer apparatus 100 may decrease the switching frequency of the switching elements S1 and S2 of the inverter 140 so that the output level increases corresponding to the target level.

In operation S705, the wireless power transfer apparatus 100 may determine whether the output level exceeds the target level. In this situation, when the output level is higher than the power range set according to the target level, the wireless power transfer apparatus 100 may determine that the output level is higher than the target level.

In operation S706, when the target level is lower than the output level, the wireless power transfer apparatus 100 may increase the switching frequency of the switching elements S1 and S2 of the inverter 140 so that the output level decreases corresponding to the target level.

In operation S707, when the target level corresponds to the output level, for example, when the target level is included in the power range set according to the target level, the wireless power transfer apparatus 100 may maintain the switching frequency of the switching elements S1 and S2 of the inverter 140 so that the output level is maintained.

In operation S708, the wireless power transfer apparatus 100 may determine whether the normal operation mode is ended. In this situation, the wireless power transfer apparatus 100 may continuously adjust the output level when the operation mode of the wireless power transfer apparatus 100 is still the normal operation mode.

Figure 8:
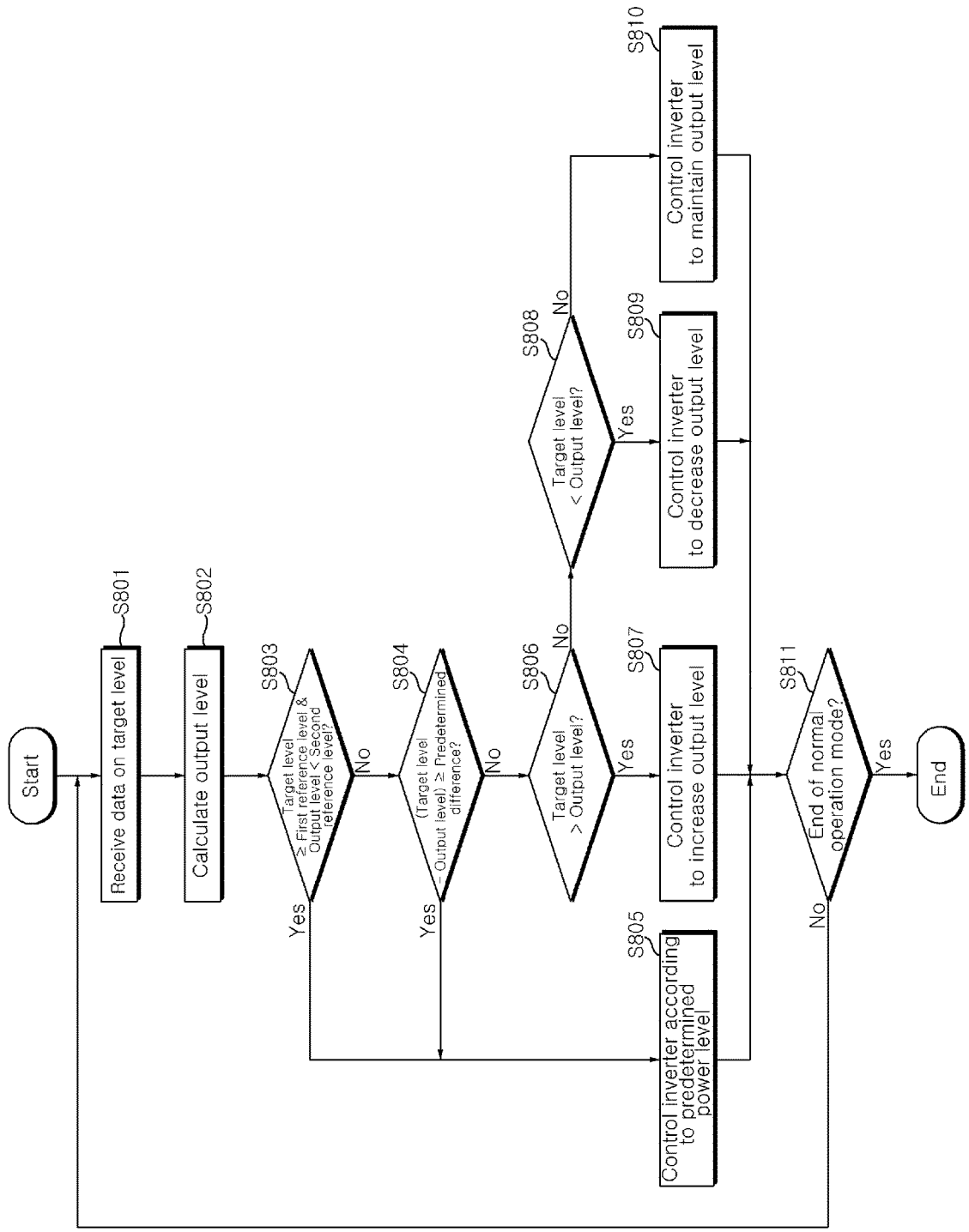
Figure 9:
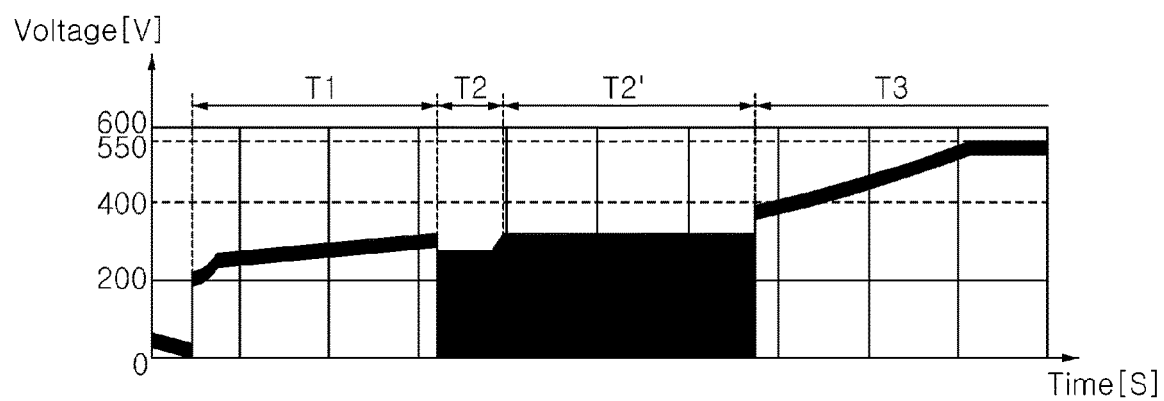
FIGS. 9 and 10 are views referred to for explanation of the method of operating the wireless power transfer apparatus.
Figure 10:
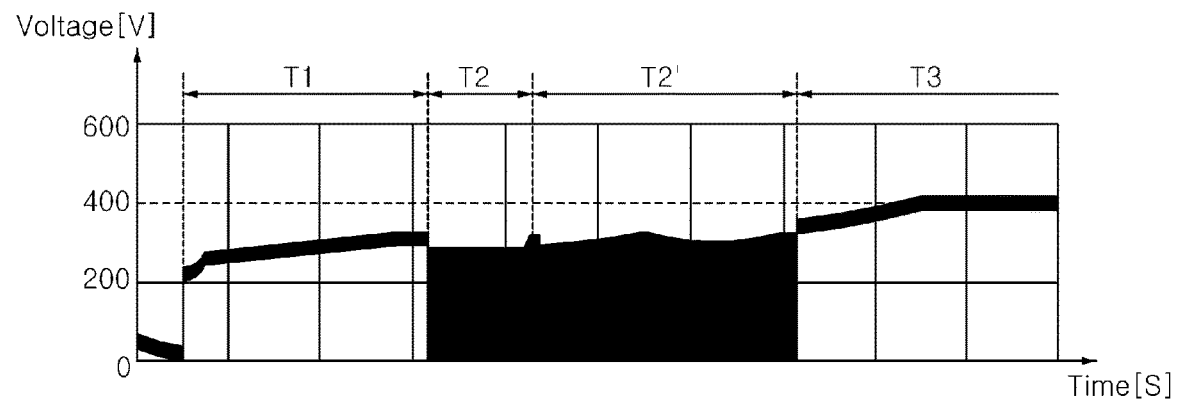

FIG. 8 is an example of a flowchart of a method of operating the wireless power transfer apparatus according to another embodiment of the present disclosure, and FIGS. 9 and 10 are views referred to for explanation of the method of operating the wireless power transfer apparatus.

Referring to FIG. 8, in operation S801, the wireless power transfer apparatus 100 may receive data on the target level from the wireless power reception apparatus 200.

In operation S802, the wireless power transfer apparatus 100 may calculate the output level.

In operation S803, the wireless power transfer apparatus 100 may determine whether the target level is higher than or equal to a first reference level and the output level is lower than a second reference level. Here, the setting of the first reference level and the second reference level will be described with reference to FIGS. 9 and 10.

FIGS. 9 and 10 are graphs of voltages applied to the DC capacitor 230 of the wireless power reception apparatus 200 as the wireless power transfer apparatus 100 transmits power.

T1 period is a period in which the wireless power transfer apparatus 100 transmits power for activating the wireless power reception apparatus 200. T2 period is a period in which the load 240 of the wireless power reception apparatus 200 operates in the full-load state while the wireless power transfer apparatus 100 transmits power to activate the wireless power reception apparatus 200. T2' period is a period in which the load 240 of the wireless power reception apparatus 200 operates in the full-load state while the wireless power transfer apparatus 100 transmits power according to the target level. T3 period is a period in which the state of the load 240 of the wireless power reception apparatus 200 is changed to the light-load state or the no-load state.

In this situation, a predetermined voltage value, which is a criterion for determining application of the overvoltage, is set to 400V, but the present disclosure is not limited thereto, and may be set according to specifications of components included in the wireless power reception apparatus 200.

Referring to FIG. 9, in periods T1 and T2, while the wireless power transfer apparatus 100 transmits power (e.g. 500 W) for activating the wireless power reception apparatus 200, a voltage of lower than the predetermined voltage value (e.g. 400V) is applied to the DC capacitor 230 of the wireless power reception apparatus 200 regardless of the load state of the wireless power reception apparatus 200.

More specifically, in T2 period, while the wireless power transfer apparatus 100 transmits power to activate the wireless power reception apparatus 200, a value of the voltage applied to the DC capacitor 230 of the wireless power reception apparatus 200 is 172V, and a peak value of the voltage is also only 269V.

Meanwhile, in T2' period, while the wireless power transfer apparatus 100 transmits power according to the target level (e.g. 2 kW), a voltage (e.g. 212V) lower than the predetermined voltage value (e.g. 400V) is applied to the DC capacitor 230 of the wireless power reception apparatus 200, and the peak value of the voltage is also only 326V.

However, in T3 period, while the wireless power transfer apparatus 100 transmits power according to the target level (e.g. 2 kW), a voltage applied to the DC capacitor 230 of the wireless power reception apparatus 200 increases, and the voltage (e.g. 548V) exceeding the predetermined voltage value (e.g. 400V) is applied to the DC capacitor 230.

As above, when the load state of the load 240 of the wireless power reception apparatus 200 rapidly changes to the light-load state or the no-load state while the wireless power transfer apparatus 100 transmits power according to the target level, the overvoltage exceeding the predetermined voltage value (e.g. 400V) may be applied to the DC capacitor 230 of the wireless power reception apparatus 200, and thus components included in the wireless power reception apparatus 200 may be damaged.

In addition, when the load state of the load 240 of the wireless power reception apparatus 200 in the normal operation mode rapidly changes to the light-load state or the no-load state, efficiency of power transmission/reception between the wireless power transfer apparatus 100 and the wireless power reception apparatus 200 may be rapidly lowered, and the output level of power transmitted from the wireless power transfer apparatus 100 may be significantly lower than the target level.

Meanwhile, unlike FIG. 9, FIG. 10 is a graph of a voltage applied to the DC capacitor 230 of the wireless power reception apparatus 200 when the target level in T2' period and T3 period is set to 1 kW Referring FIG. 10, in T2' period, a voltage of lower than the predetermined voltage value (e.g. 400V) is applied to the DC capacitor 230 of the wireless power reception apparatus 200 when the target level is 1 kW.

Meanwhile, in T3 period in which the load state of the load 240 of the wireless power reception apparatus 200 is changed to the light-load state or the no-load state, a voltage (e.g. 399V) close to the predetermined voltage value (e.g. 400V) is applied to the DC capacitor 230 of the wireless power reception apparatus 200.

That is, as shown in FIG. 10, even if the load state of the load 240 of the wireless power reception apparatus 200 is changed to the light-load state or the no-load state, when the wireless power transfer apparatus 100 transmits power according to the target level lower than the predetermined level, the overvoltage may not be applied to the DC capacitor 230 of the wireless power reception apparatus 200.

Based on this, the first reference level, which is a criterion for determining the load state of the wireless power reception apparatus 200, may be a maximum target level (e.g. 1 kW) in which the overvoltage is not applied to the DC capacitor 230 of the wireless power reception apparatus 200 even if the load state of the load 240 of the wireless power reception apparatus 200 is changed to the light-load state or the no-load state.

Meanwhile, the second reference level, which is another criterion for determining the load state of the wireless power reception apparatus 200, may be a minimum target level at which power is applied to each component of the wireless power reception apparatus 200. For example, the second reference level may correspond to power (e.g. 500 W) for activating the wireless power reception apparatus 200.

Alternatively, the second reference level may be a maximum level of the output level calculated by the wireless power transfer apparatus 100 when the load state of the wireless power reception apparatus 200 is the light-load state or the no-load state.

Referring to FIG. 8, in operation S804, when the target level is higher than the output level, and the difference between the target level and the output level is greater than or equal to a predetermined difference (e.g. 500 W), the wireless power transfer apparatus 100 may determine the load state of the wireless power reception apparatus 200 as abnormal.

In this situation, the predetermined difference (e.g. 500 W), which is a criterion for determining the load state of the wireless power reception apparatus 200, may be a value of power greater than a maximum difference (e.g. 200 W) that can be widened between the target level and the output level.

In operation S805, when the target level is higher than or equal to the first reference level, and the output level is lower than the second reference level, or when the difference between the target level and the output level is greater than or equal to the predetermined difference, the wireless power transfer apparatus 100 may determine that the load state of the wireless power reception apparatus 200 is abnormal and control the inverter 140 according to the predetermined power level lower than the target level. For example, the wireless power transfer apparatus 100 may determine the switching frequency of the switching elements S1 and S2 of the inverter 140 such that the output level corresponds to the predetermined power level lower than the target level.

In operation S806, when the target level is lower than the first reference level, the output level is higher than or equal to the second reference level, and the difference between the target level and the output level is lower than the predetermined difference, the wireless power transfer apparatus 100 may determine that the load state of the wireless power reception apparatus 200 is normal and determine whether the output level is lower than the target level.

In operation S807, when the target level is higher than the output level, the wireless power transfer apparatus 100 may decrease the switching frequency of the switching elements S1 and S2 of the inverter 140 so that the output level increases corresponding to the target level.

In operation S808 and S809, the wireless power transfer apparatus 100 may determine whether the output level exceeds the target level. When the output level is higher than the target level, the wireless power transfer apparatus 100 may increase the switching frequency of the switching elements S1 and S2 of the inverter 140 so that the output level decreases corresponding to the target level.

In operation S810, when the target level corresponds to the output level, for example, when the target level is included in the power range set according to the target level, the wireless power transfer apparatus 100 may maintain the switching frequency of the switching elements S1 and S2 of the inverter 140 so that the output level is maintained.

In operation S811, the wireless power transfer apparatus 100 may determine whether the normal operation mode is ended. In this situation, when the operation mode of the wireless power transfer apparatus 100 is still the normal operation mode the wireless power transfer apparatus 100 may continuously adjust the output level.

Figure 11:
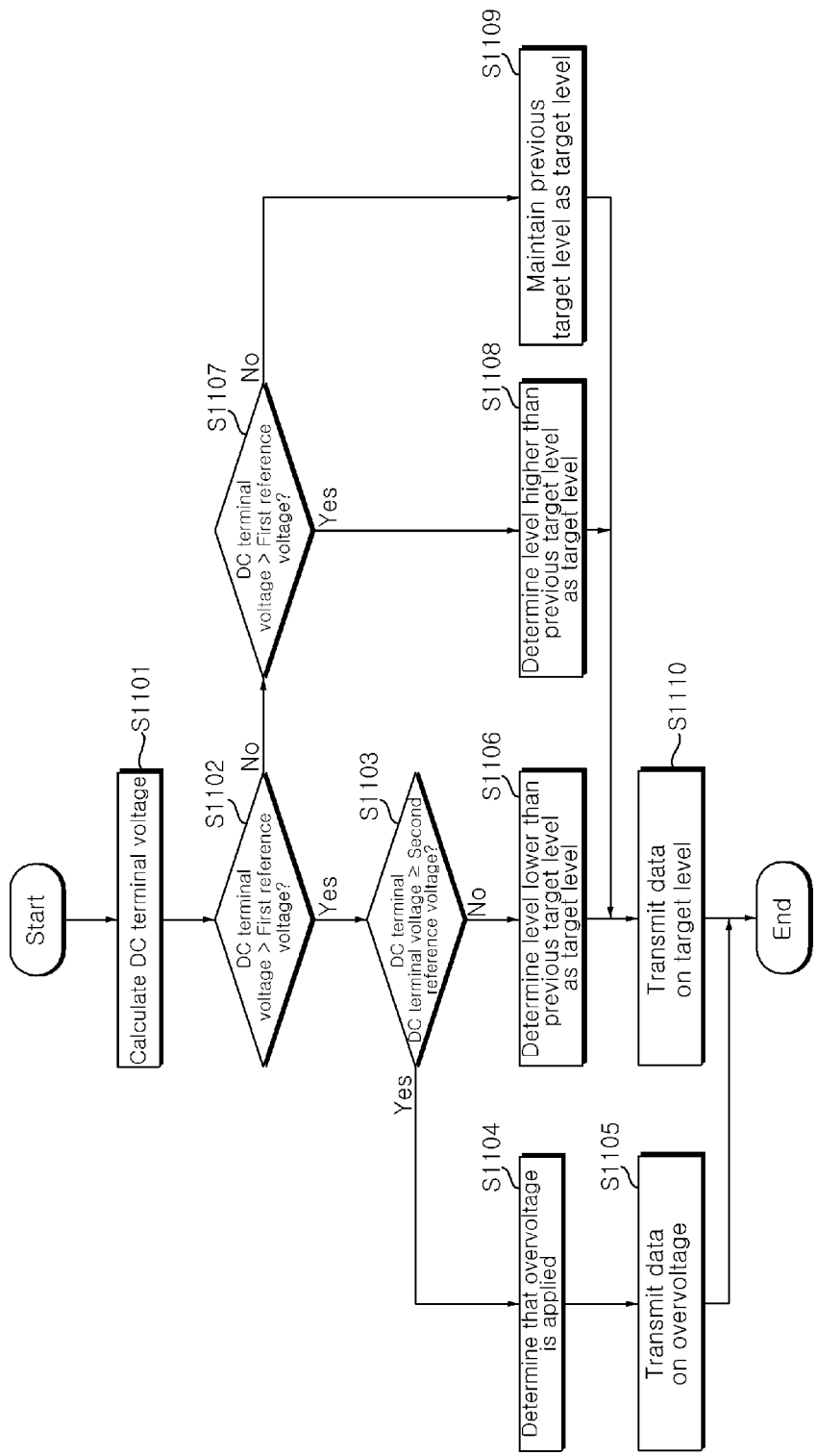
FIG. 11 is a flowchart illustrating a method of operating the wireless power reception apparatus according to an embodiment of the present disclosure.

FIG. 11 is a flowchart illustrating a method of operating the wireless power reception apparatus according to an embodiment of the present disclosure.

Referring to FIG. 11, in operation S1101, the wireless power reception apparatus 200 may calculate the DC terminal voltage Vo applied to both ends of the DC capacitor 230.

In operation S1102, the wireless power reception apparatus 200 may determine whether the DC terminal voltage Vo exceeds a first reference voltage. In this situation, the first reference voltage may be a voltage value preset according to specifications of components included in the wireless power reception apparatus 200.

When the DC terminal voltage Vo is higher than a voltage range set according to the first reference voltage, the wireless power reception apparatus 200 may determine that the DC terminal voltage Vo exceeds the first reference voltage.

In operation S1103, when the DC terminal voltage Vo exceeds the first reference voltage, the wireless power reception apparatus 200 may determine whether the DC terminal voltage Vo is higher than or equal to a second reference voltage higher than the first reference voltage. In this situation, the second reference voltage may be a minimum voltage value (e.g. 400V) to which the overvoltage is applied to components included in the wireless power reception apparatus 200.

In operation S1104 and S1105, when the DC terminal voltage (Vo) is higher than or equal to the second reference voltage, the wireless power reception apparatus 200 may determine that the overvoltage is applied to the wireless power reception apparatus 200 and transmit data on the overvoltage to the wireless power transfer apparatus 100.

In operation S1106, when the DC terminal voltage Vo is higher than the first reference voltage and lower than the second reference voltage, the wireless power reception apparatus 200 may determine a level lower than a previous target level as a target level.

In operation S1107, the wireless power reception apparatus 200 may determine whether the DC terminal voltage Vo is lower than the first reference voltage. In this situation, the wireless power reception apparatus 200 may determine that the DC terminal voltage Vo is lower than the first reference voltage when the DC terminal voltage Vo is lower than a voltage range set according to the first reference voltage.

In operation S1108, when the DC terminal voltage Vo is lower than the first reference voltage, the wireless power reception apparatus 200 may determine a level higher than the previous target level as the target level.

In operation S1109, when the dc terminal voltage Vo corresponds to the first reference voltage, for example, when the DC terminal voltage Vo is included in the voltage range set according to the first reference voltage, the wireless power reception apparatus 200 may maintain the previous target level as the target level.

In operation S1110, the wireless power reception apparatus 200 may transmit data on the determined target level to the wireless power transfer apparatus 100.

Figure 12:
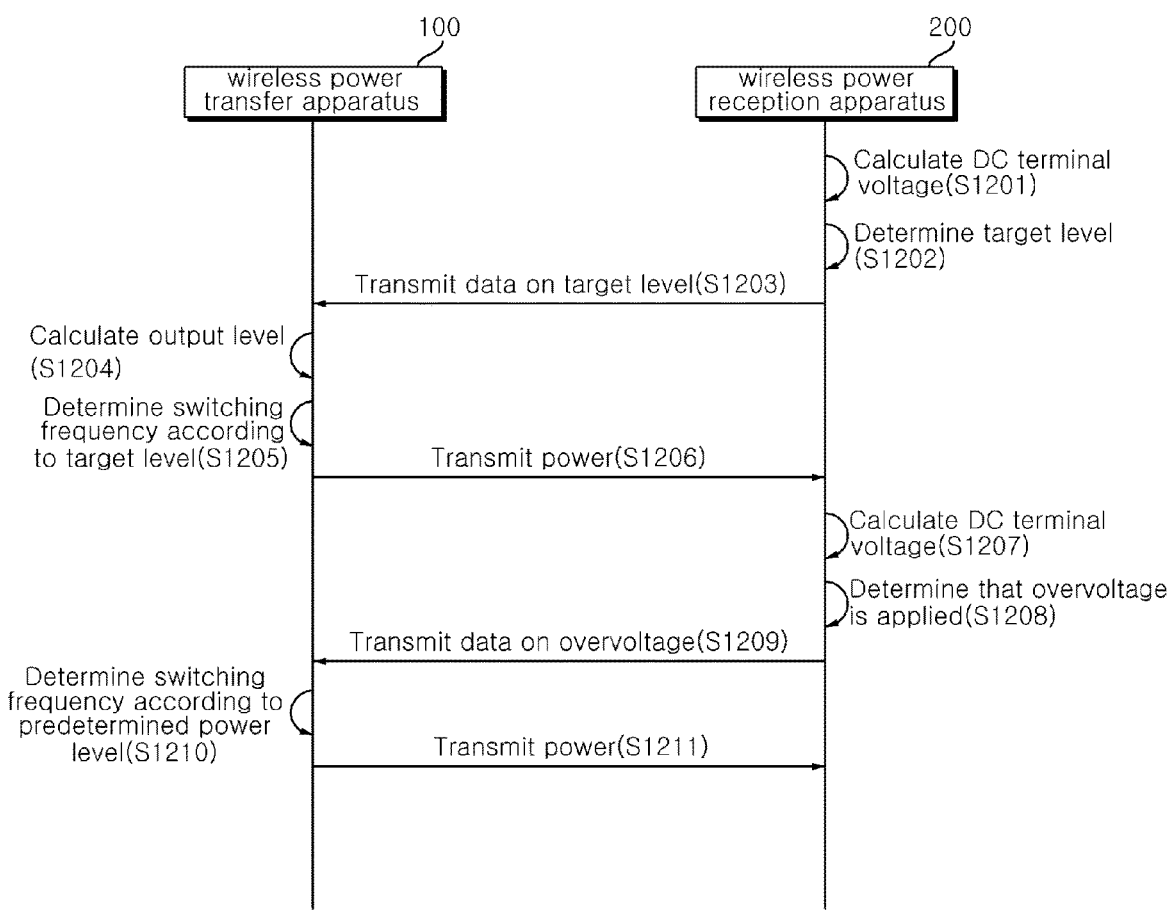
FIG. 12 is a flowchart illustrating a method of operating the system including wireless power reception apparatus and the wireless power reception apparatus according to an embodiment of the present disclosure.

FIG. 12 is a flowchart illustrating a method of operating the system including wireless power reception apparatus and the wireless power reception apparatus according to an embodiment of the present disclosure.

Referring to FIG. 12, in operation S1201, the wireless power reception apparatus 200 may calculate the DC terminal voltage Vo applied to both ends of the DC capacitor 230.

In operation S1202, the wireless power reception apparatus 200 may determine a target level based on the calculated DC terminal voltage Vo. For example, the wireless power reception apparatus 200 may determine the target level by comparing a voltage range (e.g. 210V to 230V) set according to a reference voltage (e.g. 220V) and the DC terminal voltage Vo.

In operation S1203, the wireless power reception apparatus 200 may transmit data on the determined target level to the wireless power transfer apparatus 100. For example, the wireless power reception apparatus 200 may transmit data specifying a specific level as the target level to the wireless power transfer apparatus 100.

In operation S1204, the wireless power transfer apparatus 100 may calculate the output level.

In operation S1205 and S1206, the wireless power transfer apparatus 100 may determine a switching frequency of the switching elements S1 and S2 of the inverter 140 based on a result of comparing the target level received from the wireless power reception apparatus 200 and the output level. In addition, the wireless power transfer apparatus 100 may transmit power to the wireless power reception apparatus 200 by controlling the operation of the switching elements S1 and S2 according to the determined switching frequency.

In operation S1207, the wireless power reception apparatus 200 may calculate the DC terminal voltage Vo applied to both ends of the DC capacitor 230.

In operation S1208 and S1209, the wireless power reception apparatus 200 may determine that overvoltage exceeding a predetermined voltage value is applied to the DC capacitor 230 due to the power received from the wireless power transfer apparatus 100 and transmit data on the overvoltage to the wireless power transfer apparatus 100. For example, while the wireless power reception apparatus 200 is operating according to the power received from the wireless power transfer apparatus 100, when the load state of the wireless power reception apparatus 200 rapidly is changed to the light-load state or the no-load state, the wireless power reception apparatus 200 may identify that the overvoltage is applied to the DC capacitor 230.

In operation S1210, the wireless power transfer apparatus 100 may determine that the overvoltage is applied to the wireless power reception apparatus 200 based on the data on the overvoltage received from the wireless power reception apparatus 200. In addition, in operation S1211, the wireless power transfer apparatus 100 may determine the switching frequency according to the predetermined power level lower than the target level and transmit power to the wireless power reception apparatus 200 by controlling the operation of the switching elements S1 and S2 of the inverter 140 according to the determined switching frequency.

In this situation, the predetermined power level may be a level (e.g. 600 W) equal to or higher than a power level (e.g. 500 W) for activating the power reception apparatus 200, for activating the wireless power reception apparatus 200 and lower than a maximum target level (e.g. 1 kW) at which an overvoltage is not applied to the DC capacitor 230 of the wireless power reception apparatus 200. In some examples, the maximum level may be set to avoid an overvoltage in the wireless power reception apparatus 200.

According to the embodiments of the present disclosure, since the target level is determined by the wireless power reception apparatus 200 and the wireless power transfer apparatus 100 transmits power according to the target level determined by the wireless power reception apparatus 200, the wireless power transfer apparatus 100 may appropriately transmit power regardless of a type of the wireless power reception apparatus 200, and the wireless power reception apparatus 200 may always maintain a constant voltage at the DC terminal despite a change in the load state of the wireless power reception apparatus 200.

In addition, according to the embodiments of the present disclosure, the wireless power transfer apparatus 100 can actively determine whether the overvoltage is applied to the wireless power reception apparatus 200 based on the output level, which is the level of power transmitted through the transmitting coil 150, as well as the data on the overvoltage received from the wireless power reception apparatus 200, and thus damage to the elements included in the wireless power reception apparatus 200 due to the overvoltage may be more quickly prevented.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Likewise, although operations are shown in a specific order in the drawings, it should not be understood that the operations are performed in the specific order shown in the drawings or in a sequential order so as to obtain desirable results, or all operations shown in the drawings are performed. In certain cases, multitasking and parallel processing may be advantageous.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A system comprising:
a wireless power transfer apparatus and a wireless power reception apparatus,
wherein the wireless power transfer apparatus comprises:
a transmitting coil configured to transmit power to the wireless power reception apparatus,
an inverter comprising a plurality of switching elements, the inverter being configured to output a current to the transmitting coil based on operation of one or more of the plurality of switching elements, and
a first controller configured to:
determine an output level of power transmitted through the transmitting coil,
receive, from the wireless power reception apparatus, data including a target level of power to be transmitted through the transmitting coil, and
control the inverter based on comparing the output level and the target level, and
wherein the wireless power reception apparatus comprises:
a receiving coil configured to receive power from the wireless power transfer apparatus,
a rectifier configured to rectify power transmitted from the receiving coil,
a capacitor connected to an output terminal of the rectifier, and
a second controller configured to:
determine a voltage applied to ends of the capacitor,
determine the target level based on comparing the voltage to a predetermined first reference voltage, and
transmit the data including the determined target level to the wireless power transfer apparatus.

2. The system according to claim 1, wherein the first controller is configured to:
control the inverter to increase a frequency of the current output from the inverter based on the output level being greater than a power range that is set according to the target level,
control the inverter to decrease the frequency of the current output from the inverter based on the output level being less than the power range, and
control the inverter to maintain the frequency of the current output from the inverter based on the output level being within the power range.

3. The system according to claim 2, wherein the second controller is configured to:
decrease the target level to be less than a previous target level based on the determined voltage being greater than a voltage range that is set according to the predetermined first reference voltage,
increase the target level to be greater than the previous target level based on the determined voltage being less than the voltage range, and
maintain the target level to at the previous target level based on the determined voltage being within the voltage range.

4. The system according to claim 3, wherein the first controller is configured to:
based on (i) the target level being greater than or equal to a first reference level and (ii) the output level being less than a second reference level less than the first reference level, control the inverter to maintain the output level according to a predetermined power level that is less than the target level.

5. The system according to claim 4, wherein the first reference level is a maximum level set to avoid an overvoltage in the wireless power reception apparatus.

6. The system according to claim 5, wherein the second reference level is a minimum level set to provide operation power to each component of the wireless power reception apparatus.

7. The system according to claim 6, wherein the first controller is configured to:
based on (i) the output level being less than the power range and (ii) a difference between the target level and the output level being greater than or equal to a predetermined difference, control the inverter to maintain the output level according to the predetermined power level.

8. The system according to claim 7, wherein the second controller is configured to transmit data related to the overvoltage to the wireless power transfer apparatus based on the determined voltage being greater than the voltage range and greater than or equal to a predetermined second reference voltage, and
wherein the first controller is configured to control the inverter to maintain the output level according to the predetermined power level based on receiving the data related to the overvoltage from the wireless power reception apparatus.

9. A wireless power transfer apparatus comprising:
a transmitting coil configured to transmit power to a wireless power reception apparatus; and
an inverter comprising a plurality of switching elements, the inverter being configured to output a current to the transmitting coil based on operation of one or more of the plurality of switching elements;
a controller configured to:
receive, from the wireless power reception apparatus through a communication unit, data including a target level of power to be transmitted through the transmitting coil,
determine an output level of power transmitted through the transmitting coil, and
control the inverter based on comparing the determined output level and the target level.

10. The wireless power transfer apparatus according to claim 9, wherein the controller is configured to:
control the inverter to increase a frequency of the current output from the inverter based on the output level being greater than a power range that is set according to the target level,
control the inverter to decrease the frequency of the current output from the inverter based on the output level being less than the power range, and
control the inverter to maintain the frequency of the current output from the inverter based on the output level being within the power range.

11. The wireless power transfer apparatus according to claim 10, further comprising:
a current detector configured to detect the current output from the inverter; and
a voltage detector configured to detect a voltage applied to an output terminal of the inverter, wherein the controller is configured to determine the output level based on the current detected through the current detector and the voltage detected through the voltage detector.

12. The wireless power transfer apparatus according to claim 11, wherein the controller is configured to:
based on (i) the target level being greater than or equal to a first reference level and (ii) the output level being less than a second reference level less than the first reference level, control the inverter to maintain the output level according to a predetermined power level that is less than the target level.

13. The wireless power transfer apparatus according to claim 12, wherein the first reference level is a maximum level set to avoid an overvoltage in the wireless power reception apparatus.

14. The wireless power transfer apparatus according to claim 13, wherein the second reference level is a minimum level to provide operation power to each component of the wireless power reception apparatus.

15. The wireless power transfer apparatus according to claim 14, wherein the controller is configured to:
based on (i) the output level being less than the power range and (ii) a difference between the target level and the output level being greater than or equal to a predetermined difference, control the inverter to maintain the output level according to the predetermined power level.

16. The wireless power transfer apparatus according to claim 15, wherein the controller is configured to control the inverter to maintain the output level according to the predetermined power level based on receiving data related to the overvoltage from the wireless power reception apparatus through the communication unit.

17. A wireless power reception apparatus comprising:
a receiving coil configured to receive power from a wireless power transfer apparatus;
a rectifier configured to rectify power transmitted from the receiving coil;
a capacitor connected to an output terminal of the rectifier; and
a controller configured to:
determine a voltage applied to ends of the capacitor,
determine a target level of power to be transmitted from the wireless power transfer apparatus based on comparing the determined voltage and a predetermined first reference voltage, and
transmit data including the target level to the wireless power transfer apparatus through a communication unit.

18. The wireless power reception apparatus according to claim 17, wherein the controller is configured to:
decrease the target level to be less than a previous target level based on the determined voltage being greater than a voltage range that is set according to the predetermined first reference voltage,
increase the target level to be greater than the previous target level based on the determined voltage being less than the voltage range, and
maintain the target level at the previous target level based on the determined voltage being within the voltage range.

19. The wireless power reception apparatus according to claim 18, wherein the controller is configured to:
determine that an overvoltage is applied to the capacitor based on the determined voltage being greater than the voltage range and greater than or equal to a predetermined second reference voltage, and
transmit data related to the overvoltage to the wireless power transfer apparatus through the communication unit based on determining that the overvoltage is applied to the capacitor.

20. The wireless power reception apparatus according to claim 17, wherein the rectifier is electrically connected to the receiving coil,
wherein the capacitor is a direct current (DC) capacitor that is electrically connected to the rectifier, and
wherein the receiving coil, the rectifier, and the DC capacitor are arranged electrically parallel to one another.

* * * * *